(12) United States Patent
Khoe et al.

(10) Patent No.: US 8,806,369 B2
(45) Date of Patent: Aug. 12, 2014

(54) DEVICE, METHOD, AND GRAPHICAL USER INTERFACE FOR MANAGING AND INTERACTING WITH CONCURRENTLY OPEN SOFTWARE APPLICATIONS

(75) Inventors: May-Li Khoe, San Francisco, CA (US); Daniel John Coster, San Francisco, CA (US); Julian Missig, Redwood City, CA (US); Jeffrey Traer Bernstein, San Francisco, CA (US); Nicholas Zambetti, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/333,909

(22) Filed: Dec. 21, 2011

(65) Prior Publication Data
US 2013/0050263 A1 Feb. 28, 2013

Related U.S. Application Data

(60) Provisional application No. 61/528,089, filed on Aug. 26, 2011.

(51) Int. Cl.
*G06F 3/048* (2013.01)
*G06F 3/0481* (2013.01)
*G06F 3/0488* (2013.01)
*G06F 3/0482* (2013.01)

(52) U.S. Cl.
CPC ............ *G06F 3/0481* (2013.01); *G06F 3/0488* (2013.01); *G06F 3/0482* (2013.01)
USPC ........... 715/808; 715/788; 715/781; 715/764; 715/803; 715/810

(58) Field of Classification Search
CPC .... G06F 3/0481; G06F 3/0488; G06F 3/0482
USPC .................. 715/788, 781, 808, 764, 803, 810
See application file for complete search history.

(56) References Cited

U.S. PATENT DOCUMENTS 5,910,882 A 6/1999 Burrell
6,115,043 A 9/2000 Levine et al.
(Continued)

FOREIGN PATENT DOCUMENTS

CN 1955906 5/2007
CN 101102573 1/2008
(Continued)

OTHER PUBLICATIONS

Fehily, C., "Visual QuickStart Guide: Microsoft Windows 7", (2009), Peachpit Press, pp. x, 34-37, 40, 71, 76, and 267.*

(Continued)

*Primary Examiner* — Patrick Riegler
*Assistant Examiner* — Mong-Shune Chung
(74) *Attorney, Agent, or Firm* — Morrison & Foerster LLP

(57) ABSTRACT

While in a first mode, a first electronic device displays on a touch-sensitive display a first application view that corresponds to a first application. In response to detecting a first input, the electronic device enters a second mode, and concurrently displays in a first predefined area an initial group of application icons with at least a portion of the first application view adjacent to the first predefined area. While in the second mode, in response to detecting a first touch gesture on an application icon that corresponds to a second application, the electronic device displays a popup view corresponding to a full-screen-width view of the second application on a second electronic device. In response to detecting one or more second touch gestures within the popup view, the electronic device performs an action in the second application that updates a state of the second application.

21 Claims, 29 Drawing Sheets

(56) References Cited

U.S. PATENT DOCUMENTS

| | | |
|---|---|---|
| 6,459,424 B1 | 10/2002 | Resman |
| 6,489,975 B1 | 12/2002 | Patil et al. |
| 6,831,666 B1 | 12/2004 | Kreis |
| 7,036,088 B2 | 4/2006 | Tunney |
| 7,134,093 B2 | 11/2006 | Etgen et al. |
| 7,346,855 B2 | 3/2008 | Hellyar et al. |
| 7,380,218 B2 | 5/2008 | Rundell |
| 7,581,186 B2 | 8/2009 | Dowdy et al. |
| 7,673,255 B2 | 3/2010 | Schechter et al. |
| 7,694,236 B2 | 4/2010 | Gusmorino et al. |
| 7,739,604 B1 | 6/2010 | Lyons et al. |
| 7,757,185 B2 | 7/2010 | Paquette et al. |
| 7,788,595 B2 | 8/2010 | Biwer et al. |
| 7,880,728 B2 | 2/2011 | de los Reyes et al. |
| 7,921,373 B2 | 4/2011 | Yamashita et al. |
| 8,010,900 B2 | 8/2011 | Hart et al. |
| 8,020,028 B1 | 9/2011 | Lutter |
| 8,024,670 B1 | 9/2011 | Rahmatian et al. |
| 8,046,712 B2 | 10/2011 | Landman et al. |
| 8,214,768 B2 | 7/2012 | Boule et al. |
| 2004/0025112 A1 | 2/2004 | Chasen et al. |
| 2004/0155908 A1 | 8/2004 | Wagner |
| 2004/0174398 A1* | 9/2004 | Luke et al. .............. 345/856 |
| 2005/0022138 A1 | 1/2005 | Tunney |
| 2006/0107226 A1* | 5/2006 | Matthews et al. ............. 715/766 |
| 2006/0161861 A1 | 7/2006 | Holecek et al. |
| 2006/0242602 A1 | 10/2006 | Schechter et al. |
| 2006/0265653 A1 | 11/2006 | Paasonen et al. |
| 2007/0004451 A1 | 1/2007 | Anderson |
| 2007/0128899 A1 | 6/2007 | Mayer |
| 2007/0157089 A1 | 7/2007 | van Os et al. |
| 2007/0220445 A1 | 9/2007 | Yach et al. |
| 2007/0262964 A1 | 11/2007 | Zotov et al. |
| 2008/0036743 A1 | 2/2008 | Westerman et al. |
| 2008/0094368 A1 | 4/2008 | Ording et al. |
| 2008/0109753 A1 | 5/2008 | Karstens |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168401 A1 | 7/2008 | Boule et al. |
| 2008/0211959 A1 | 9/2008 | Balram et al. |
| 2008/0270910 A1 | 10/2008 | Lukasik et al. |
| 2009/0036108 A1 | 2/2009 | Chou |
| 2009/0293007 A1 | 11/2009 | Duarte et al. |
| 2010/0088628 A1 | 4/2010 | Flygh et al. |
| 2010/0125816 A1 | 5/2010 | Bezos |
| 2010/0269039 A1* | 10/2010 | Pahlavan et al. .............. 715/702 |
| 2010/0299597 A1 | 11/2010 | Shin et al. |
| 2011/0035662 A1 | 2/2011 | King et al. |
| 2011/0043652 A1 | 2/2011 | King et al. |
| 2011/0087982 A1 | 4/2011 | McCann et al. |
| 2011/0096174 A1 | 4/2011 | King et al. |
| 2011/0145068 A1 | 6/2011 | King et al. |
| 2011/0164042 A1 | 7/2011 | Chaudhri |
| 2011/0167058 A1 | 7/2011 | van Os |
| 2011/0167339 A1 | 7/2011 | Lemay |
| 2011/0167382 A1 | 7/2011 | van Os |
| 2011/0202872 A1 | 8/2011 | Park |
| 2011/0258582 A1 | 10/2011 | Bang |
| 2011/0296333 A1 | 12/2011 | Bateman et al. |
| 2011/0307778 A1 | 12/2011 | Tsai et al. |
| 2012/0216139 A1 | 8/2012 | Ording et al. |
| 2012/0218304 A1 | 8/2012 | Anzures et al. |
| 2013/0080923 A1 | 3/2013 | Anzures et al. |

FOREIGN PATENT DOCUMENTS

| | | | |
|---|---|---|---|
| CN | 101727268 | A | 6/2010 |
| EP | 1 562 105 | A2 | 8/2005 |
| EP | 1 568 966 | A2 | 8/2005 |
| EP | 1 571 549 | A2 | 9/2005 |
| EP | 1 640 855 | A2 | 3/2006 |
| WO | WO 2009/059062 | | 5/2009 |
| WO | WO 2009/143294 | | 11/2009 |

OTHER PUBLICATIONS

Fahey, M., "The iPad Blows Up iPhone Apps Real Good", Jan. 28, 2010, [retrieved on Nov. 18, 2013], retrieved from the Internet: <URL: www.kotaku.com.au/2010/01/the-ipad-blows-up-iphone-apps-real-good/>, p. 1-3.*

Apple: "iPhone User Guide for iPhone and iPhone 3G," Jul. 11,2006, 154 pages, http://manuals.info.apple.com/en_US/iPhone_User_Guide.pdf.

HTC, "User Manual—PDA Phone—HTC_P3050 Touch," Nov. 2, 2007, pp. 12-28, http://web.archive.org/web/20101228223033/http://www.comparecellular.com/images/phones/userguide1130.pdf.

Jade et al., "Apple's iPhone 4.0 to support multitasking via Expose-like interface," appleInsider.com, Mar. 31, 2010, 4 pages, http://www.appleinsider.com/articles/10/03/31/apples_iphone_4_0_to_support_multitasking_via_expose_like_interface.html.

Jade et al., "Apple's iPhone 4.0 software to deliver multitasking support" ApplehInsider.com, Mar. 11, 2010, 3 pages, http://www.appleinsider.com/articles/10/03/11/apples_iphone_4_0_software_to_deliver_multitasking_support.html.

Newman, "Sprint's HTC EVO 4G: 5 Killer Features," pcworld, Mar. 24, 2010, 3 pages, http://www.pcworld.com/article/192286/sprints_htc_4g_5_killer_features.html.

Nickinson, "Review: The new HTC Sense interface on Android phones," Android Central, Feb. 22, 2010, 10 pages, http://www.androidcentral.com/review-new-htc-sense-android-phones.

Savov, "HTC enhances Sense with Leap and Friend Stream (updated with video)," Engadget, Feb. 16, 2010, http://www.engadget.com/2010/02/16/htc-enhances-sense-with-leap-and-friend-stream/.

International Search Report and Written Opinion dated Dec. 10,2010, received in International Application No. PCT/US2010/050057, which corresponds to US. Appl. No. 12/888,381, 10 pages (Chaudhri).

Office Action dated May 22, 2012, received in U.S. Appl. No. 12/888,381, 19 pages (Chaudhri).

Office Action dated May 10, 2012, received in U.S. Appl. No. 12/888,382, 9 pages (Chaudhri).

Office Action dated May 17, 2012, received in U.S. Appl. No. 12/888,384, 15 pages (Chaudhri).

Office Action dated May 16, 2012, received in U.S. Appl. No. 12/888,386, 12 pages (Chaudhri).

Notice of Allowance dated Jun. 15, 2012, received U.S. Appl. No, 12/888,391, 26 pages (Chaudhri).

Moth, D., "Share Code—Write Code Once for Both Mobile and Desktop Apps," MSDN Magazine, Jul. 2007, 11 pages, http://msdn.msdn.microsoft.com/en-us/magazine/cc163387.aspx.

Nilsson,D., "Design guidelines for mobile applications," SINTEF ICT, Jun. 2008, 73 pages.

Nilsson et al., "Design patterns for user interface for mobile applications," Advances in Engineering Software, Elsevier Science, Oxford, GB, vol. 40, No. 12, Dec. 1, 2009, pp. 1318-1328.

Rieger, B., Effective Design for Multiple Screen Sizes, Jan. 2009, 12 pages.

Seffah et al., "Multi-devices 'Multiple' user interfaces: development models and research opportunities," The Journal of Systems and Software, available online Dec. 2003, 14 pages.

Viana et al., "Xmobile: A MB-UID environment for semi-automatic generation of adaptive applications for mobile devices," The Journal of Systems and Software, available online Jun. 2007, 13 pages.

International Search Report and Written Opinion dated May 17, 2011, received in International Application No. PCT/US2010/062306, which corresponds to U.S. Appl. No. 12/789,426.

European Search Report dated May 16, 2011, received in European Patent Application No. 11150223.3, which corresponds to U.S. Appl. No. 12/789,426.

International Search Report and Written Opinion dated Apr. 14, 2011, received in International Application No. PCT/US2010/062309, which corresponds to U.S. Appl. No. 12/788,277.

Office Action dated Apr. 4, 2013, received in U.S. Appl. No. 12/789,426, 9 pages (Lemay).

(56) References Cited

OTHER PUBLICATIONS

Office Action dated Jun. 14, 2013, received in Australian Patent Application No. 2010339698, which corresponds to U.S. Appl. No. 12/789,426, 3 pages (Lemay).
Decision to Grant dated Aug. 1, 2013, received in European Patent Application No. 11150223.3, which corresponds to U.S. Appl. No. 12/789,426, 1 page (Lemay).
Office Action dated Aug. 30, 2012, received in U.S. Appl. No. 12/788,277, 17 pages (Chaudhri).
Final Office Action dated Mar. 12, 2013, received in U.S. Appl. No. 12/788,277, 20 pages (Chaudhri).
Office Action dated Jun. 28, 2013, received in U.S. Appl. No. 13/077,524, 21 pages (Kocienda).
Office Action dated Mar. 29, 2012, received in European Patent Application No. 11 150 223.3, which corresponds to U.S. Appl. No. 12/789,426, 2 pages (Lemay).
Office Action dated Jun. 14, 2013, received in Australian Patent Application No. 2010339633, which corresponds to U.S. Appl. No. 12/788,277, 3 pages (Chaudhri).
Office Action dated Aug. 28, 2012, received in European Patent Application No. 11 150 188.8, which corresponds to U.S. Appl. No. 12/788,277, 4 pages (Chaudhri).
Office Action dated May 24, 2013, received in Chinese Patent Application No. 201010602688.2, which corresponds to U.S. Appl. No. 12/888,381, 7 pages (Chaudhri).
Office Action dated Aug. 6, 2013, received in European Patent Application No. 10 760 867.1, which corresponds to U.S. Appl. No. 12/888,381, 4 pages (Chaudhri).
Final Office Action dated Sep. 12, 2013, received in U.S. Appl. No. 12/888,389, 10 pages (Chaudhri).
Final Office Action dated Nov. 19, 2012, received in U.S. Appl. No. 12/888,381, 16 pages (Chaudhri).
Office Action dated Aug. 28, 2012, received in Chinese Patent Application No. 201010602688.2 which corresponds to U.S. Appl. No. 12/888,381, 6 pages (Chaudhri).
Final Office Action dated Nov. 15, 2012, received in U.S. Appl. No. 12/888,382, 14 pages (Chaudhri).
Final Office Action dated Nov. 7, 2012, received in U.S. Appl. No. 12/888,384, 15 pages (Chaudhri).
Final Office Action dated Nov. 8, 2012 received in U.S. Appl. No. 12/888,386, 16 pages (Chaudhri).
Office Action dated Jan. 23, 2013, received in U.S. Appl. No. 12/888,389, 14 pages (Chaudhri).

* cited by examiner

While in the second mode:

626 While in the second mode: detect, in the first predefined area, a fourth touch gesture of a second type on a second application icon that corresponds to a third application in the plurality of applications; and, in response to detecting the fourth touch gesture of the second type on the second application icon: cease to display the first application view; cease to display the application icons; exit the second mode; and display on the touch-sensitive display an entire second application view that corresponds to the third application and occupies the entire touch-sensitive display without concurrently displaying an application view for any other application in the plurality of applications.

628 The first popup view is initially displayed adjacent to the first predefined area. While in the second mode: detect a fifth touch gesture originating on the first popup view; and while detecting the fifth touch gesture, move the first popup view in accordance with the fifth touch gesture.

630 The first popup view includes one or more user interface objects. While in the second mode: detect a sixth touch gesture on a first user interface object of the one or more user interface objects; and, in response to detecting the sixth touch gesture on the first user interface object: cease to display the first application view; cease to display the application icons; cease to display the popup view; exit the second mode; and display on the touch-sensitive display an entire third application view that corresponds to the second application and occupies the entire touch-sensitive display without concurrently displaying an application view for any other application in the plurality of applications.

632 The first popup view corresponds to the full-screen-width view of the corresponding second application on the second electronic device in a first orientation; and the first popup view includes one or more user interface objects. While in the second mode: detect an seventh touch gesture on a second user interface object of the one or more user interface objects; and, in response to detecting the seventh touch gesture on the second user interface object, display a popup view that corresponds to a full-screen-width view of the corresponding second application on the second electronic device in a second orientation distinct from the first orientation.

634 While displaying the first popup view in the second mode: detect a respective touch gesture at a location that corresponds to a respective portion of the first application view not covered by any popup view; and, in response to detecting the respective touch gesture at a location that corresponds to the respective portion of the first application view not covered by any popup view: cease to display the popup view; cease to display the application icons; exit the second mode; and display the entire first application view.

Figure 6C

DEVICE, METHOD, AND GRAPHICAL USER INTERFACE FOR MANAGING AND INTERACTING WITH CONCURRENTLY OPEN SOFTWARE APPLICATIONS

RELATED APPLICATIONS

This application claims priority to U.S. Provisional Application Ser. No. 61/528,089, filed Aug. 26, 2011, entitled "Device, Method, and Graphical User Interface for Managing and Interacting with Concurrently Open Software Applications," which is incorporated by reference herein in its entirety.

This application is related to the following: (1) U.S. patent application Ser. No. 12/888,381, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," (2) U.S. application Ser. No. 12/888,382, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," (3) U.S. application Ser. No. 12/888,384, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," (4) U.S. application Ser. No. 12/888,386, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," (5) U.S. application Ser. No. 12/888,389, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," (6) U.S. application Ser. No. 12/888,391, filed Sep. 22, 2010, entitled "Device, Method, and Graphical User Interface for Managing Concurrently Open Software Applications," which claims priority to U.S. Provisional Application Ser. No. 61/321,869, filed Apr. 7, 2010, entitled "Device, Method, and Graphical User Interface for Managing Concurrently Open Software Applications," and (7) U.S. patent application Ser. No. 12/789,426, filed May 27, 2010, entitled "Device, Method, and Graphical User Interface with Interactive Popup Views," which claims priority to U.S. Provisional Application Ser. No. 61/292,498, filed Jan. 6, 2010, entitled "Device, Method, and Graphical User Interface with Interactive Popup Views." All of these applications are incorporated by reference herein in their entirety.

TECHNICAL FIELD

This relates generally to electronic devices with touch-sensitive displays, including but not limited to electronic devices with touch-sensitive displays that have multiple, concurrently open software applications.

BACKGROUND

The use of touch-sensitive surfaces as input devices for computers and other electronic computing devices has increased significantly in recent years. Exemplary touch-sensitive surfaces include touch screen displays. Such surfaces are widely used to select, launch, and manage software applications.

For electronic devices with touch screen displays, existing methods for managing and interacting with concurrently open applications are cumbersome and inefficient. For example, a user may have difficulty seeing and interacting with the currently open applications. This situation creates a significant cognitive burden on a user. In addition, existing methods for managing and interacting with currently open applications take longer than necessary, thereby wasting energy. This latter consideration is particularly important in battery-operated devices.

SUMMARY

Accordingly, there is a need for computing devices with faster, more efficient methods and interfaces for managing and interacting with concurrently open applications. Such methods and interfaces may complement or replace conventional methods for managing and interacting with concurrently open applications. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at a first electronic device with a touch-sensitive display. The method includes, while in a first mode, displaying on the touch-sensitive display a first application view that corresponds to a first application in a plurality of applications. The first application view is displayed without concurrently displaying an application view for any other application in the plurality of applications. The method also includes detecting a first input, and, in response to detecting the first input:

entering a second mode distinct from the first mode, wherein the second mode is configured for interacting with popup views and selecting one of the applications for display of a corresponding application view; displaying in a first predefined area an initial group of application icons that correspond to at least some of the plurality of applications; and concurrently displaying at least a portion of the first application view adjacent to the first predefined area. The method further includes, while in the second mode: detecting, in the first predefined area, a first touch gesture of a first type on a first application icon that corresponds to a second application in the plurality of applications; and, in response to detecting the first touch gesture of the first type on the first application icon, displaying a first popup view partially covering at least the portion of the first application view. The first popup view corresponds to a full-screen-width view of a corresponding second application on a second electronic device having a touch-sensitive display with lower resolution than the touch-sensitive display of the first electronic device. The method also includes detecting one or more second touch gestures within the first popup view; and, in response to detecting the one or more second touch gestures within the first popup view, performing an action in the second application that updates a state of the second application.

In accordance with some embodiments, a first electronic device includes a touch-sensitive display, one or more processors, memory, and one or more programs. The one or more programs are stored in the memory and configured to be executed by the one or more processors. The one or more programs include instructions for, while in a first mode, displaying on the touch-sensitive display a first application view that corresponds to a first application in a plurality of applications. The first application view is displayed without concurrently displaying an application view for any other application in the plurality of applications. The one or more programs also include instructions for detecting a first input; and, in response to detecting the first input: entering a second mode distinct from the first mode, wherein the second mode is configured for interacting with popup views and selecting one of the applications for display of a corresponding application view; displaying in a first predefined area an initial group of application icons that correspond to at least some of the plurality of applications; and concurrently displaying at least a portion of the first application view adjacent to the first predefined area. The one or more programs further include instructions for, while in the second mode: detecting, in the first predefined area, a first touch gesture of a first type on a first application icon that corresponds to a second application in the plurality of applications; and, in response to detecting the first touch gesture of the first type on the first application icon, displaying a first popup view partially covering at least the portion of the first application view. The first popup view corresponds to a full-screen-width view of a corresponding second application on a second electronic device having a touch-sensitive display with lower resolution than the touch-sensitive display of the first electronic device. The one or more programs also include instructions for detecting one or more second touch gestures within the first popup view; and, in response to detecting the one or more second touch gestures within the first popup view, performing an action in the second application that updates a state of the second application.

In accordance with some embodiments, a computer readable storage medium has stored therein instructions, which, when executed by a first electronic device with a touch-sensitive display, cause the device to, while in a first mode, display on the touch-sensitive display a first application view that corresponds to a first application in a plurality of applications. The first application view is displayed without concurrently displaying an application view for any other application in the plurality of applications. The instructions also cause the device to detect a first input; and, in response to detecting the first input: enter a second mode distinct from the first mode, wherein the second mode is configured for interacting with popup views and selecting one of the applications for display of a corresponding application view; display in a first predefined area an initial group of application icons that correspond to at least some of the plurality of applications; and concurrently display at least a portion of the first application view adjacent to the first predefined area. The instructions further cause the device to, while in the second mode: detect, in the first predefined area, a first touch gesture of a first type on a first application icon that corresponds to a second application in the plurality of applications; and, in response to detecting the first touch gesture of the first type on the first application icon, display a first popup view partially covering at least the portion of the first application view. The first popup view corresponds to a full-screen-width view of a corresponding second application on a second electronic device having a touch-sensitive display with lower resolution than the touch-sensitive display of the first electronic device. The instructions also cause the device to detect one or more second touch gestures within the first popup view; and, in response to detecting the one or more second touch gestures within the first popup view, perform an action in the second application that updates a state of the second application.

In accordance with some embodiments, a graphical user interface on a first electronic device with a touch-sensitive display, a memory, and one or more processors to execute one or more programs stored in the memory includes, while in a first mode, a first application view that corresponds to a first application in a plurality of applications. The first application view is displayed without concurrently displaying an application view for any other application in the plurality of applications. In response to detecting a first input: a second mode distinct from the first mode is entered, wherein the second mode is configured for interacting with popup views and selecting one of the applications for display of a corresponding application view; an initial group of application icons that correspond to at least some of the plurality of applications is displayed in a first predefined area; and at least a portion of the first application view is concurrently displayed adjacent to the first predefined area. While in the second mode, in response to detecting, in the first predefined area, a first touch gesture of a first type on a first application icon that corresponds to a second application in the plurality of applications, a first popup view partially covering at least the portion of the first application view is displayed. The first popup view corresponds to a full-screen-width view of a corresponding second application on a second electronic device having a touch-sensitive display with lower resolution than the touch-sensitive display of the first electronic device. In response to detecting one or more second touch gestures within the first popup view, an action is performed in the second application that updates a state of the second application.

In accordance with some embodiments, a first electronic device includes: a touch-sensitive display; and means, enabled while in a first mode, including means for displaying on the touch-sensitive display a first application view that corresponds to a first application in a plurality of applications. The first application view is displayed without concurrently displaying an application view for any other application in the plurality of applications. The first electronic device also includes means for detecting a first input; and means, enabled in response to detecting the first input, including: means for entering a second mode distinct from the first mode, wherein the second mode is configured for interacting with popup views and selecting one of the applications for display of a corresponding application view; means for displaying in a first predefined area an initial group of application icons that correspond to at least some of the plurality of applications; and means for concurrently displaying at least a portion of the first application view adjacent to the first predefined area. The first electronic device further includes means, enabled while in the second mode, including: means for detecting, in the first predefined area, a first touch gesture of a first type on a first application icon that corresponds to a second application in the plurality of applications; and means, enabled in response to detecting the first touch gesture of the first type on the first application icon, for displaying a first popup view partially covering at least the portion of the first application view. The first popup view corresponds to a full-screen-width view of a corresponding second application on a second electronic device having a touch-sensitive display with lower resolution than the touch-sensitive display of the first electronic device. The first electronic device also includes means for detecting one or more second touch gestures within the first popup view; and means, enabled in response to detecting the one or more second touch gestures within the first popup view, for performing an action in the second application that updates a state of the second application.

In accordance with some embodiments, an information processing apparatus for use in a first electronic device with a touch-sensitive display includes: means for means, enabled while in a first mode, including means for displaying on the touch-sensitive display a first application view that corresponds to a first application in a plurality of applications. The first application view is displayed without concurrently displaying an application view for any other application in the plurality of applications. The information processing apparatus also includes means for detecting a first input; and means, enabled in response to detecting the first input, including: means for entering a second mode distinct from the first mode, wherein the second mode is configured for interacting with popup views and selecting one of the applications for display of a corresponding application view; means for displaying in a first predefined area an initial group of application icons that correspond to at least some of the plurality of applications; and means for concurrently displaying at least a portion of the first application view adjacent to the first predefined area. The information processing apparatus further includes means, enabled while in the second mode, including: means for detecting, in the first predefined area, a first touch gesture of a first type on a first application icon that corresponds to a second application in the plurality of applications; and means, enabled in response to detecting the first touch gesture of the first type on the first application icon, for displaying a first popup view partially covering at least the portion of the first application view. The first popup view corresponds to a full-screen-width view of a corresponding second application on a second electronic device having a touch-sensitive display with lower resolution than the touch-sensitive display of the first electronic device. The information processing apparatus also includes means for detecting one or more second touch gestures within the first popup view; and means, enabled in response to detecting the one or more second touch gestures within the first popup view, for performing an action in the second application that updates a state of the second application.

In accordance with some embodiments, a first electronic device includes a touch-sensitive display unit configured to display, while in a first mode, a first application view that corresponds to a first application in a plurality of applications. The first application view is displayed without concurrently displaying an application view for any other application in the plurality of applications. The first electronic device also includes a processing unit coupled to the touch-sensitive display unit. The processing unit is configured to, while in the first mode: detect a first input; and, in response to detecting the first input: enter a second mode distinct from the first mode, wherein the second mode is configured for interacting with popup views and selecting one of the applications for display of a corresponding application view; enable display, in a first predefined area, of an initial group of application icons that correspond to at least some of the plurality of applications; and enable concurrent display of at least a portion of the first application view adjacent to the first predefined area. The processing unit is configured to, while in the second mode: detect, in the first predefined area, a first touch gesture of a first type on a first application icon that corresponds to a second application in the plurality of applications; and, in response to detecting the first touch gesture of the first type on the first application icon, enable display of a first popup view partially covering at least the portion of the first application view. The first popup view corresponds to a full-screen-width view of a corresponding second application on a second electronic device having a touch-sensitive display unit with lower resolution than the touch-sensitive display unit of the first electronic device. The processing unit is further configured to detect one or more second touch gestures within the first popup view; and, in response to detecting the one or more second touch gestures within the first popup view, perform an action in the second application that updates a state of the second application.

Thus, electronic devices with touch-sensitive displays are provided with faster, more efficient methods and interfaces for managing and interacting with concurrently open applications, thereby increasing the effectiveness, efficiency, and user satisfaction with such devices. Such methods and interfaces may complement or replace conventional methods for managing and interacting with concurrently open applications.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of managing and interacting with concurrently open applications in accordance with some embodiments.

DESCRIPTION OF EMBODIMENTS

Electronic devices with touch-screen displays have graphical user interfaces for selecting, launching, and managing software applications. Users often want to launch and interact with multiple applications simultaneously. But managing and interacting with multiple software applications becomes complex and confusing for many users. Moreover, some applications that are designed for display in a smaller screen area are provided in popup views rather than using the entire screen area.

Here, an improved method for managing and interacting with concurrently open applications using popup views is disclosed. A first application view (e.g., a web browser application view) is displayed in a single application view mode. In response to a simple input, the device enters into an application selection and popup interaction mode. In the application selection and popup interaction mode, a group of application icons is displayed concurrently with a portion of the first application view (e.g., the web browser application view), which may be shown in a full-screen-width view. The user may select one of the application icons, and, in response, a corresponding application (e.g., a calculator application) is displayed in a popup view concurrently with a portion of the first application view (e.g., the web browser application view). The user may interact with the corresponding application (e.g., the calculator application) in the popup view. In turn, the user may select another application icon to concurrently display, with the first popup view (e.g., the popup view for the calculator application), a second corresponding application (e.g., a map application) in a second popup view, and so on. Alternatively, the user may select another application icon to concurrently display the second corresponding application, and dismiss the first application. The device can easily exit the application selection and popup interaction mode and return to the separate, single application view mode. Thus, a user can interact with multiple concurrently displayed popup views in one mode, yet also easily switch to interact with just one application in a separate, single application view mode.

Figure 2:
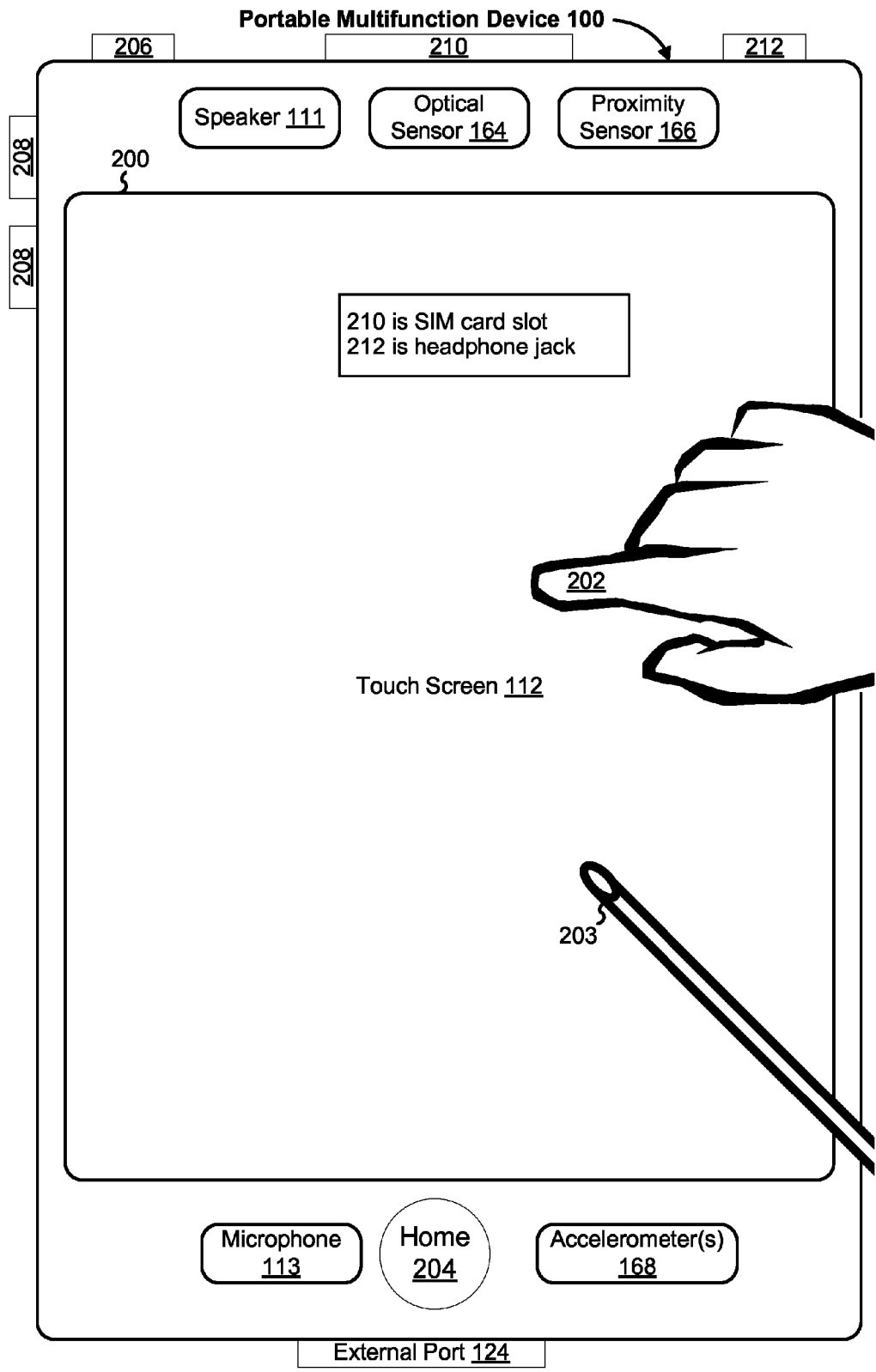
FIG. 2 illustrates a portable multifunction device having a touch screen in accordance with some embodiments.
Figure 3:
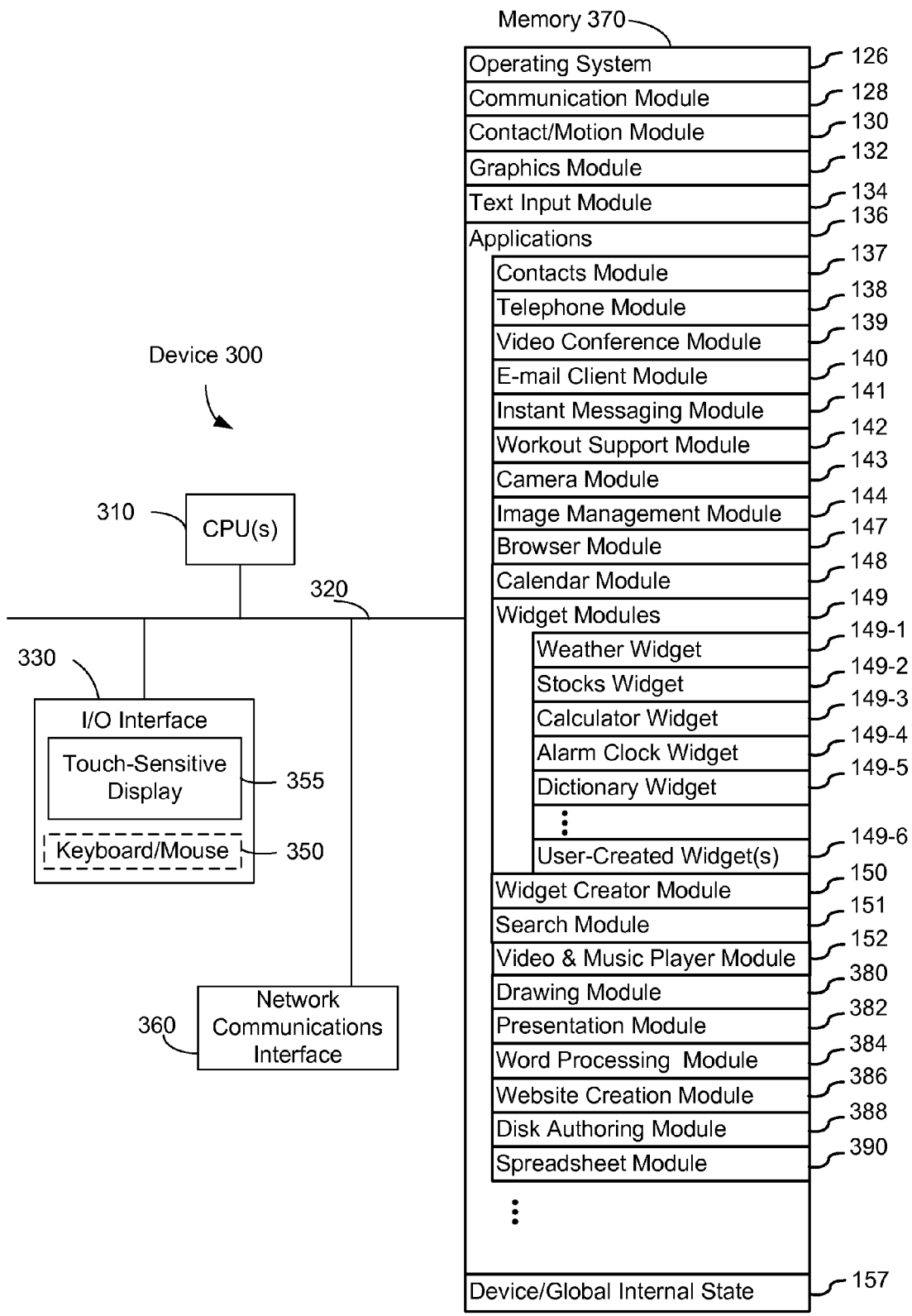
FIG. 3 is a block diagram of an exemplary multifunction device with a touch-sensitive surface in accordance with some embodiments.
Figure 4:
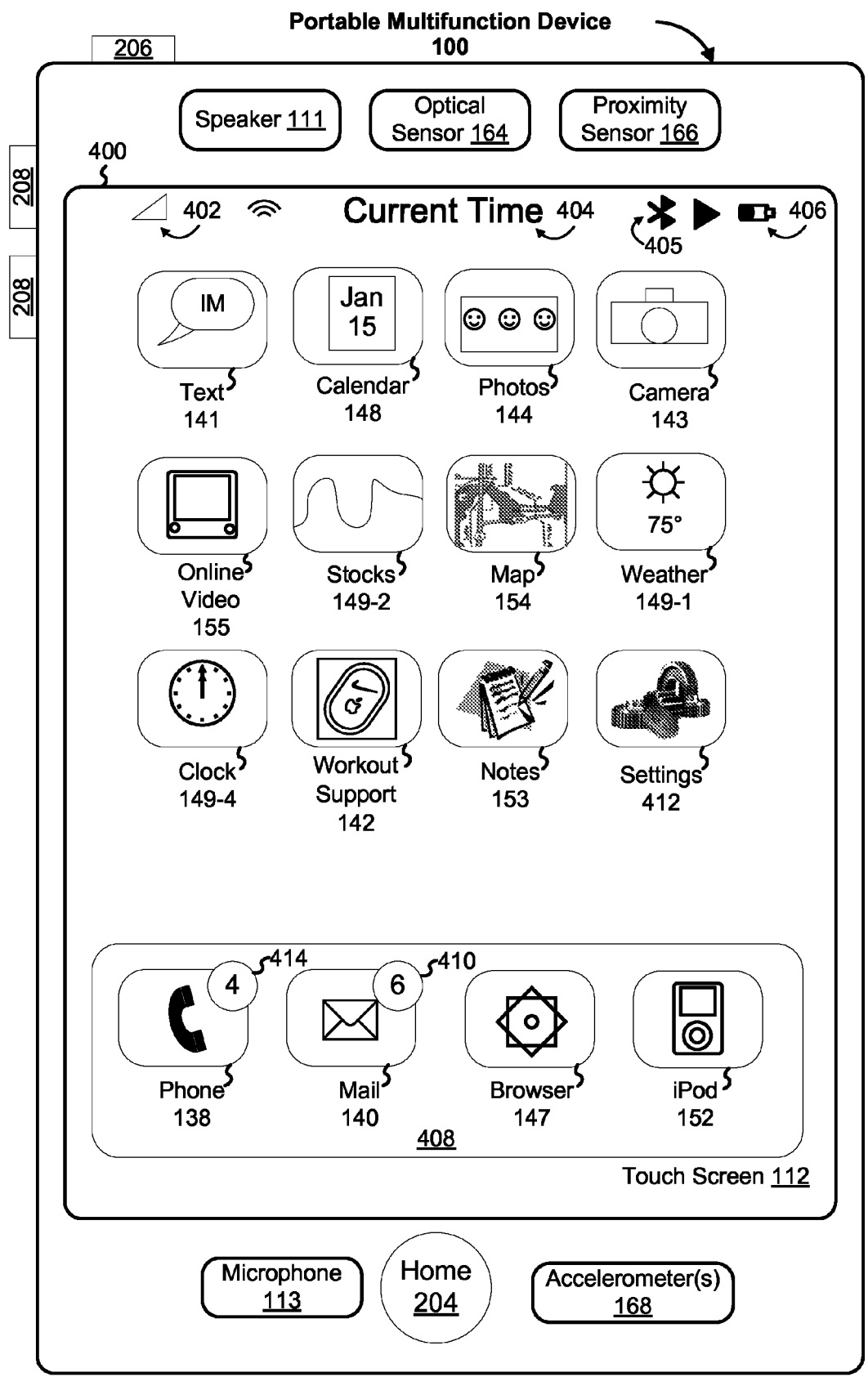
FIG. 4 illustrates an exemplary user interface for a menu of applications on a portable multifunction device in accordance with some embodiments.
Figure 5A:
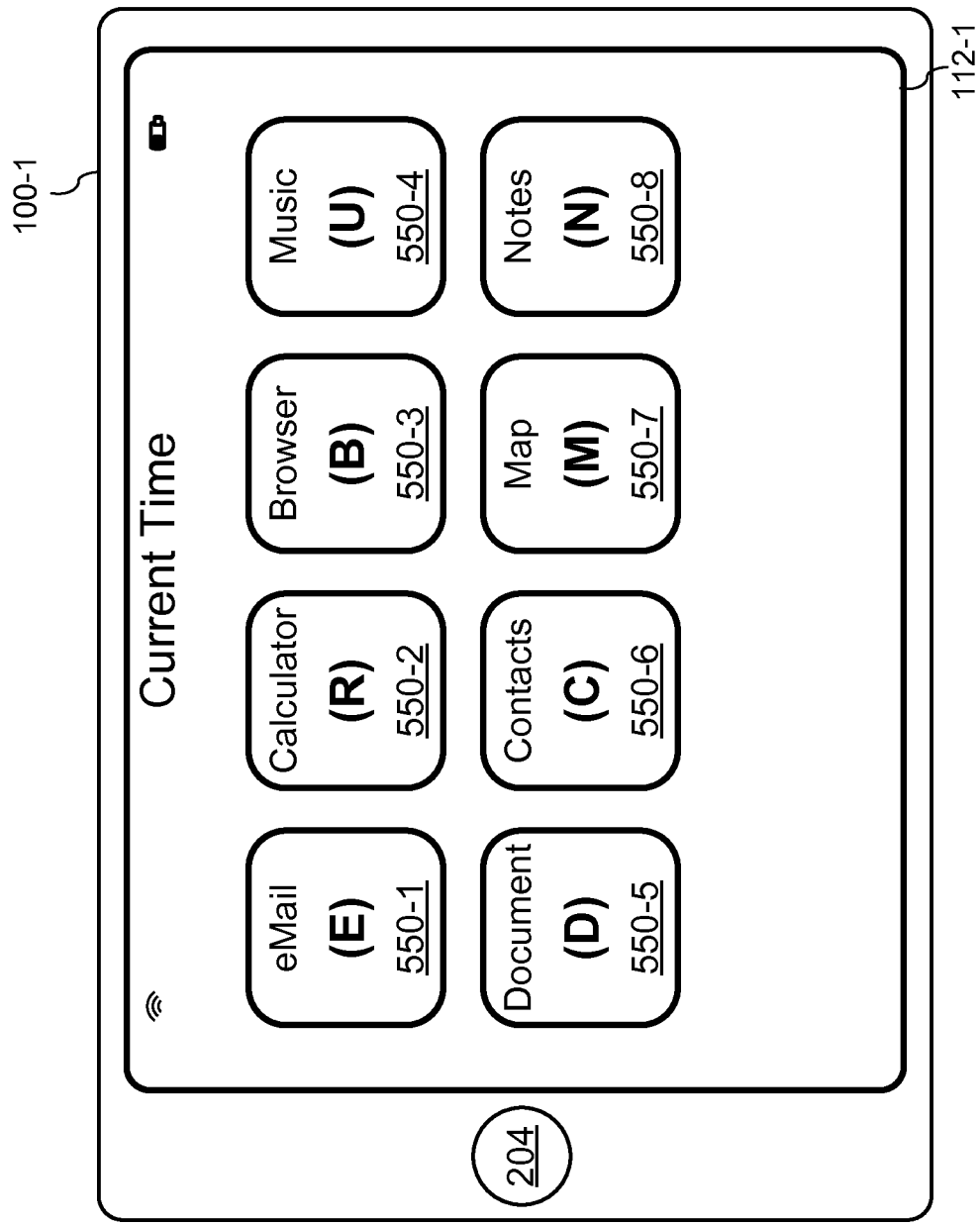
FIGS. 5A-5T illustrate exemplary user interfaces for managing and interacting with concurrently open applications in accordance with some embodiments.
Figure 5B:
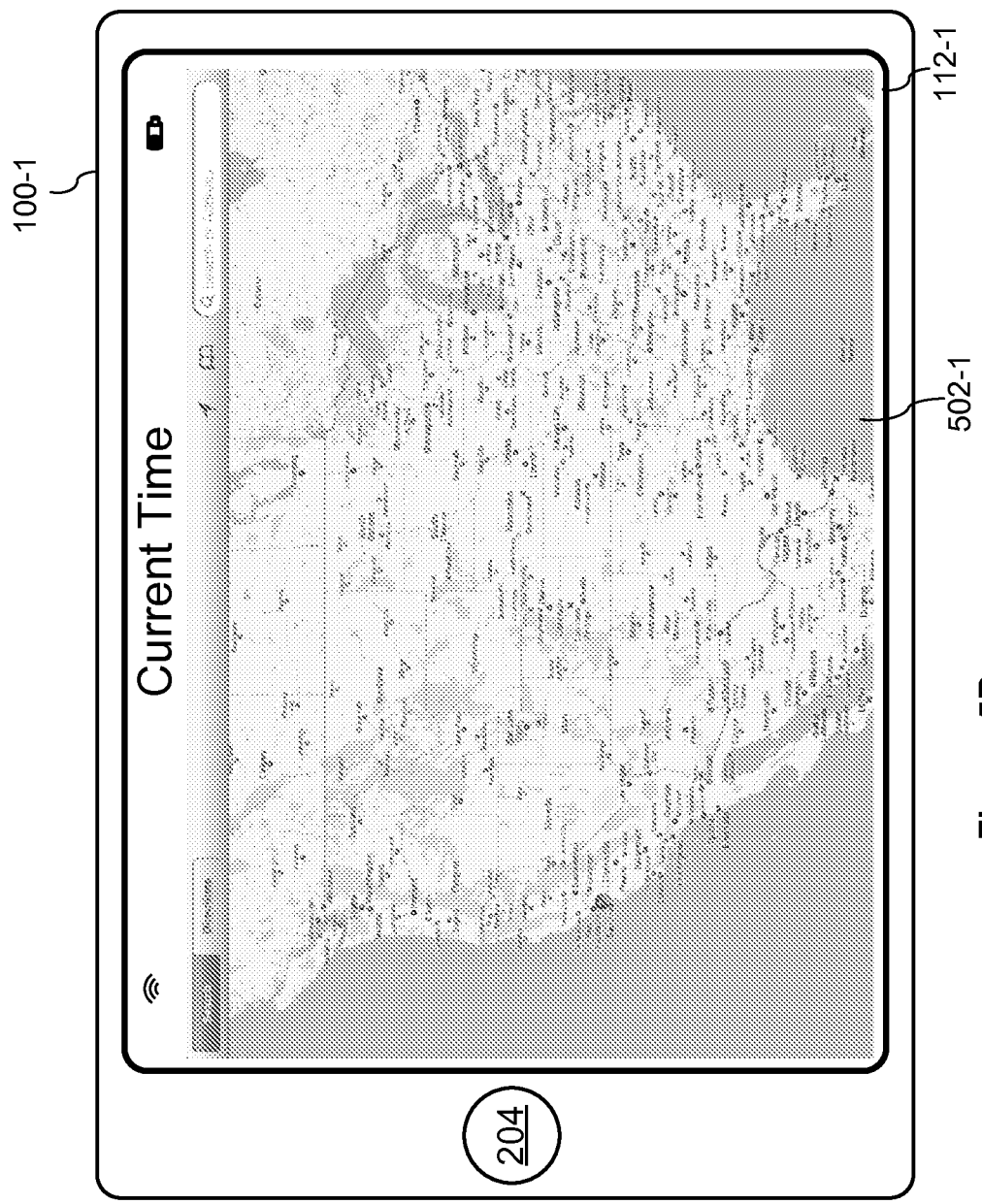
Figure 5C:
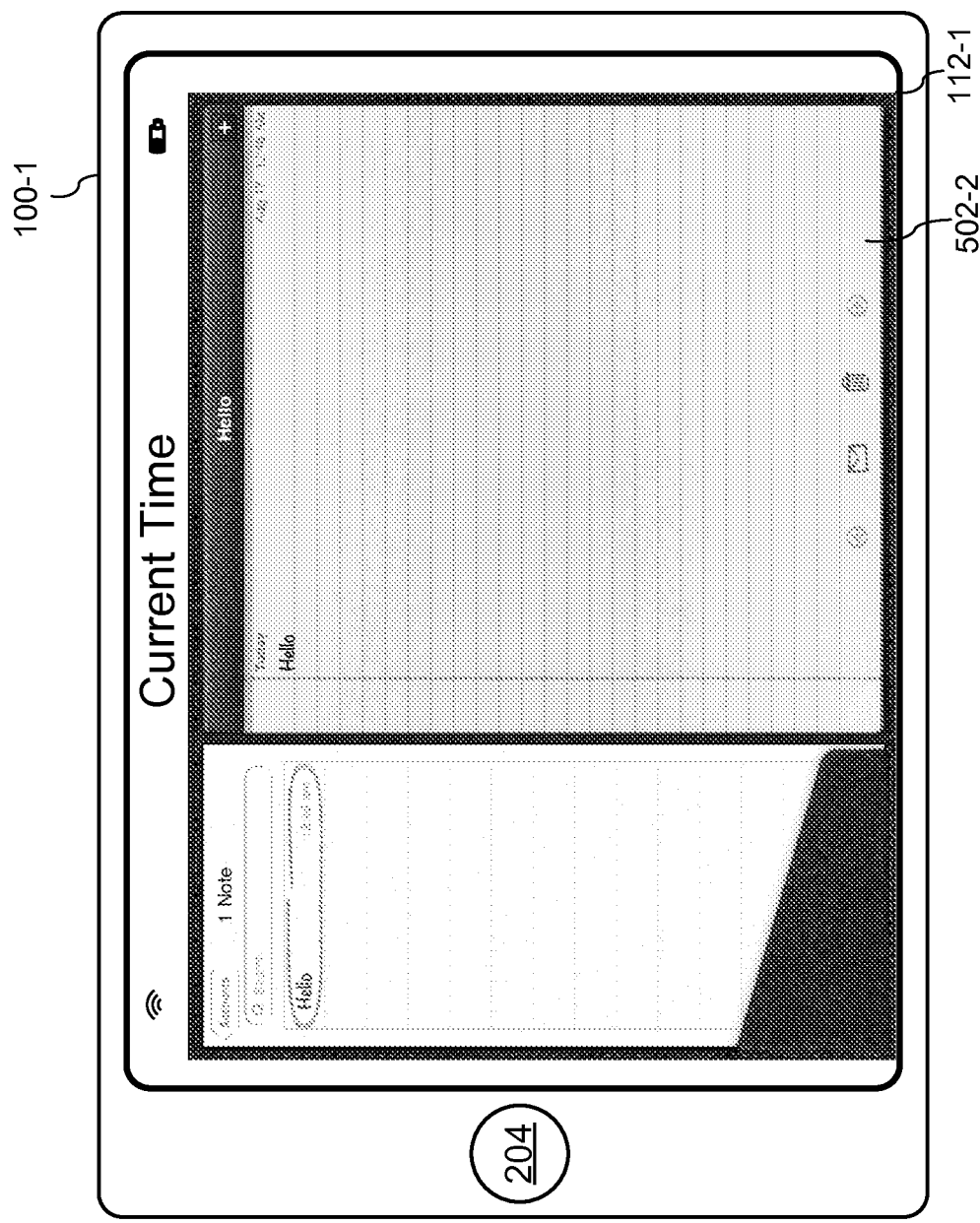
Figure 5D:
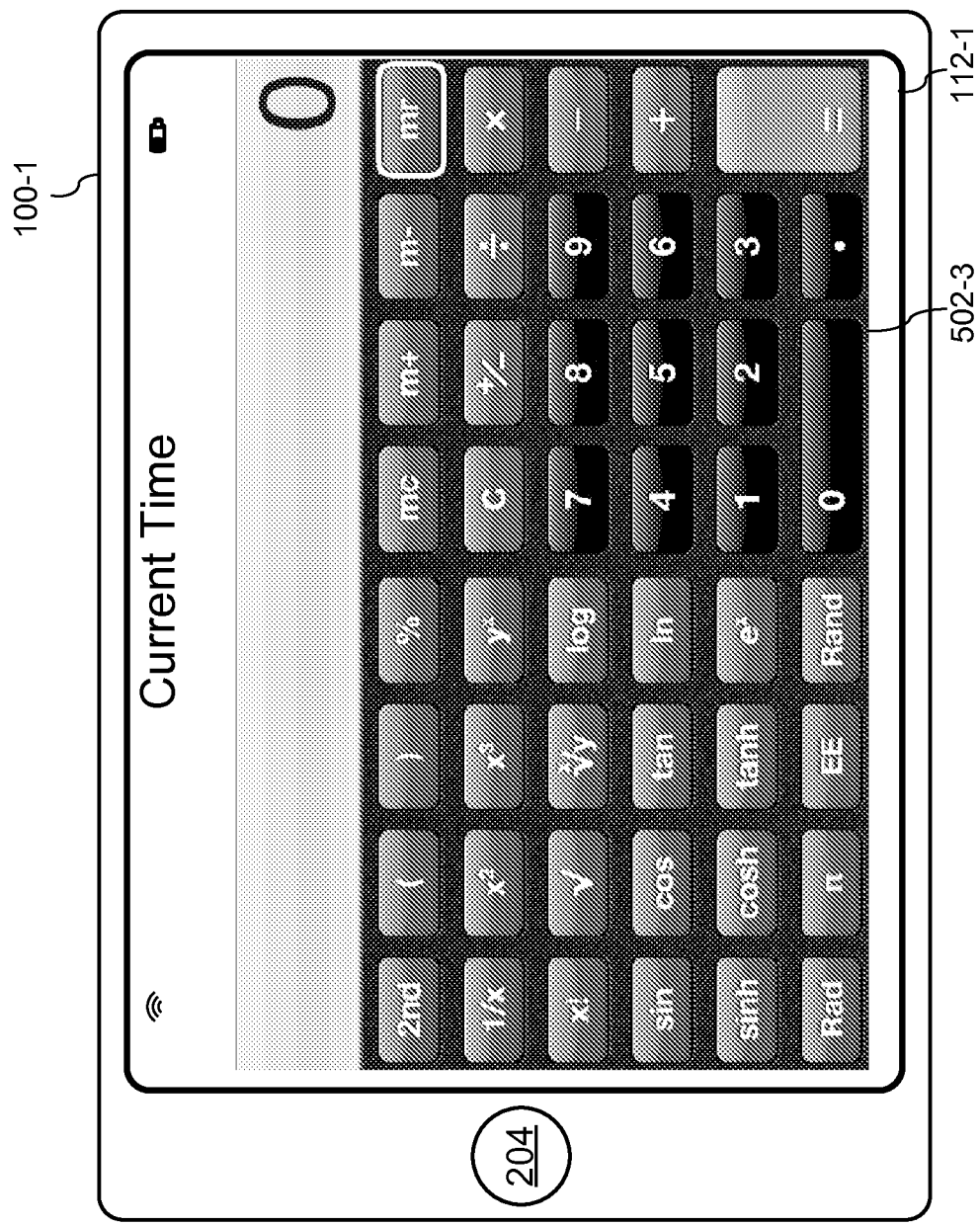
Figure 5E:
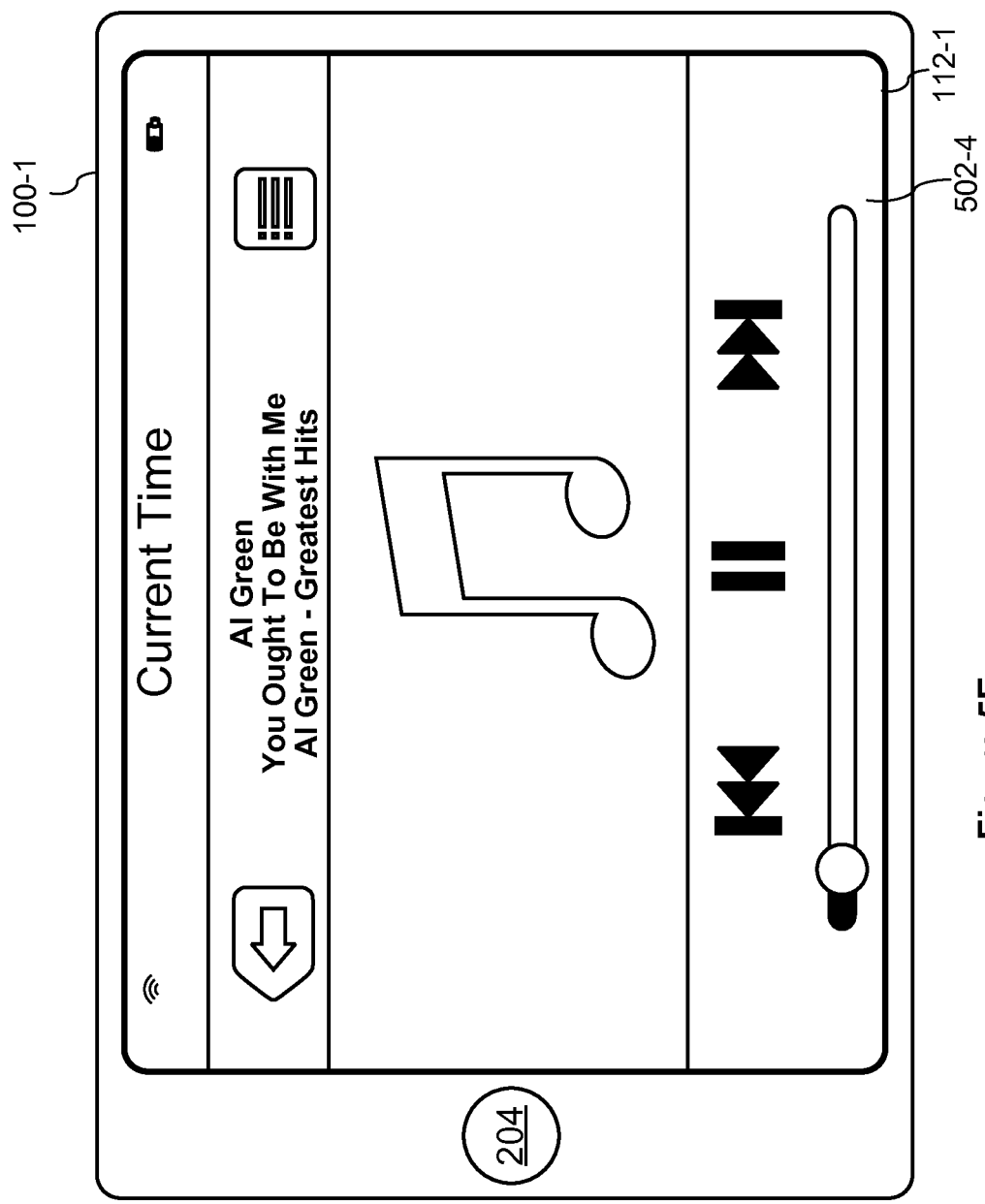
Figure 5F:
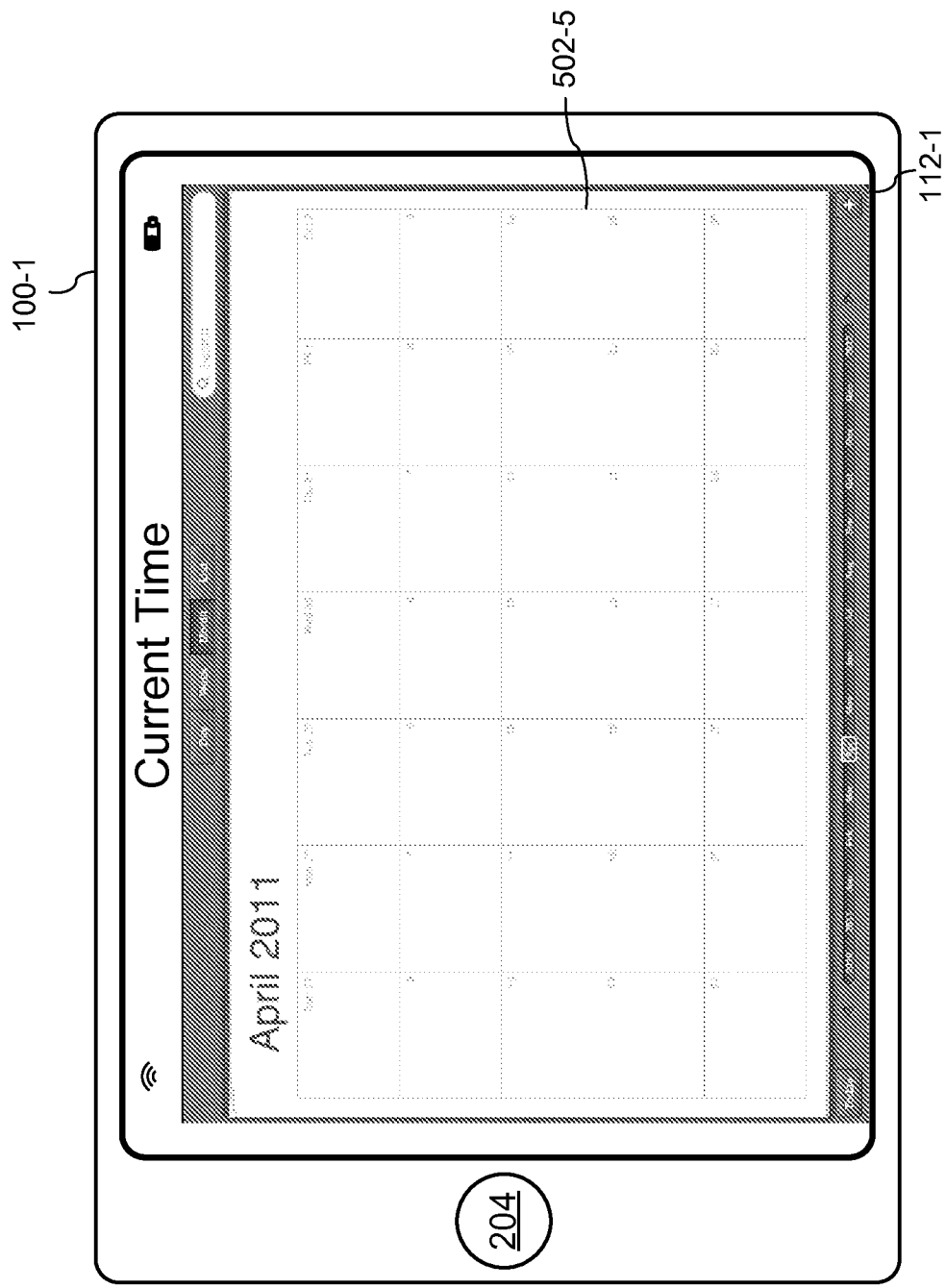
Figure 5G:
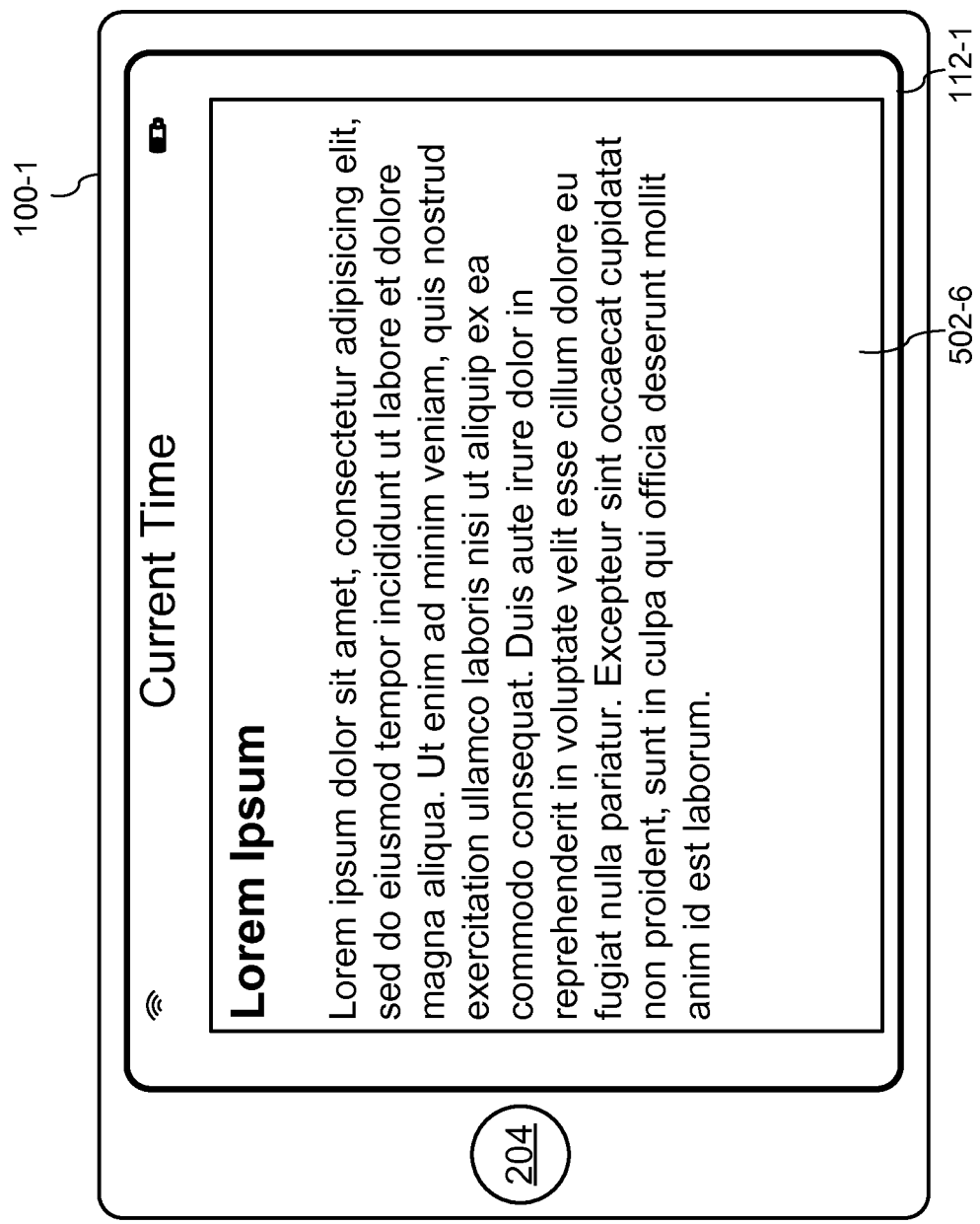
Figure 5H:
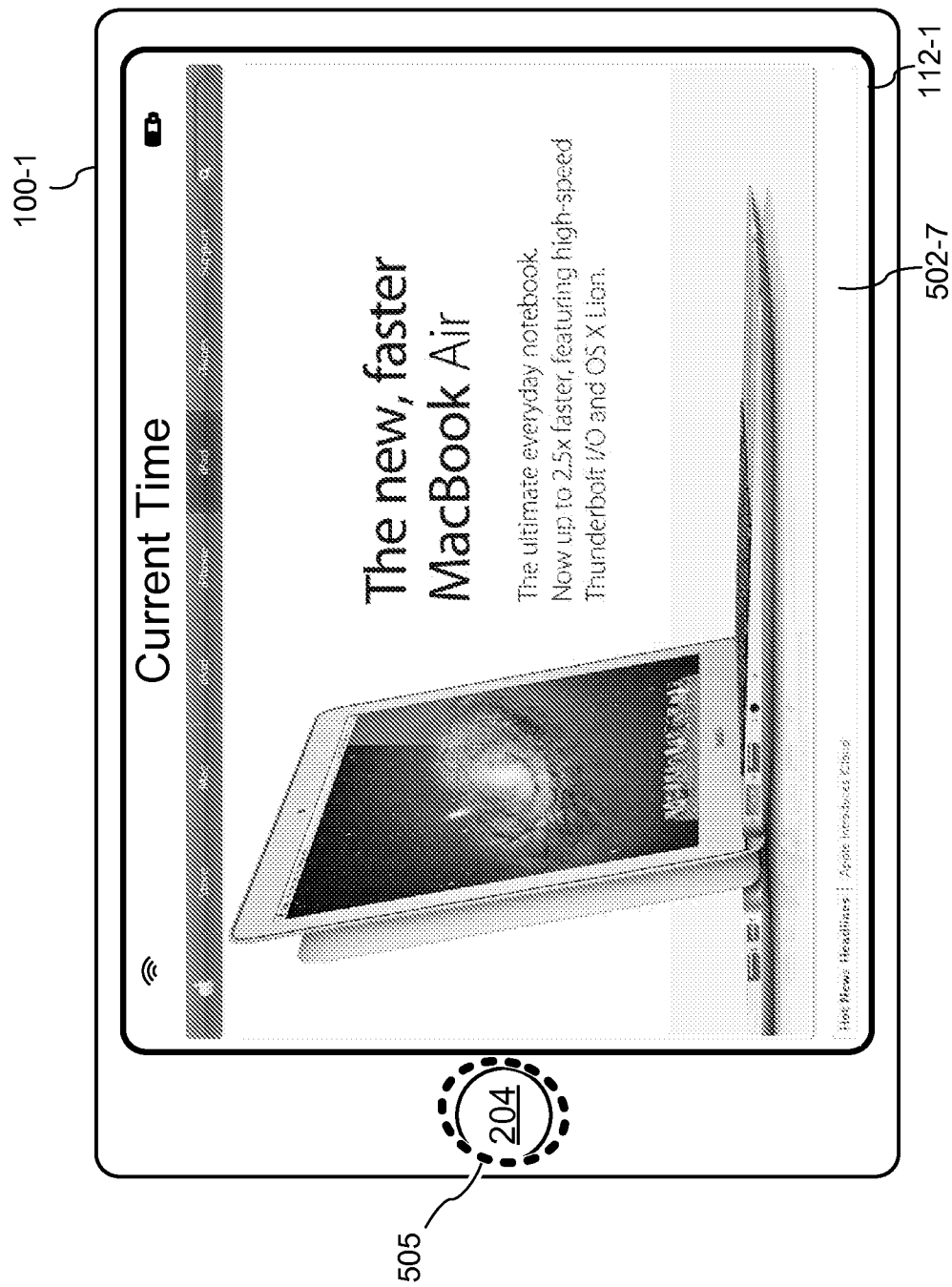

Below, FIGS. 1A-1B, 2, and 3 provide a description of exemplary devices. FIGS. 4 and 5A-5T illustrate exemplary user interfaces for managing and interacting with concurrently open applications. FIGS. 6A-6C are flow diagrams illustrating a method of managing and interacting with concurrently open applications. The user interfaces in FIGS. 5A-5T are used to illustrate the processes in FIGS. 6A-6C.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1920×1080-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays), may also be used. It should also be understood that, in some embodiments, the device is not a portable communications device, but is a desktop computer with a touch-sensitive surface (e.g., a touch screen display).

In the discussion that follows, an electronic device that includes a touch-sensitive display is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
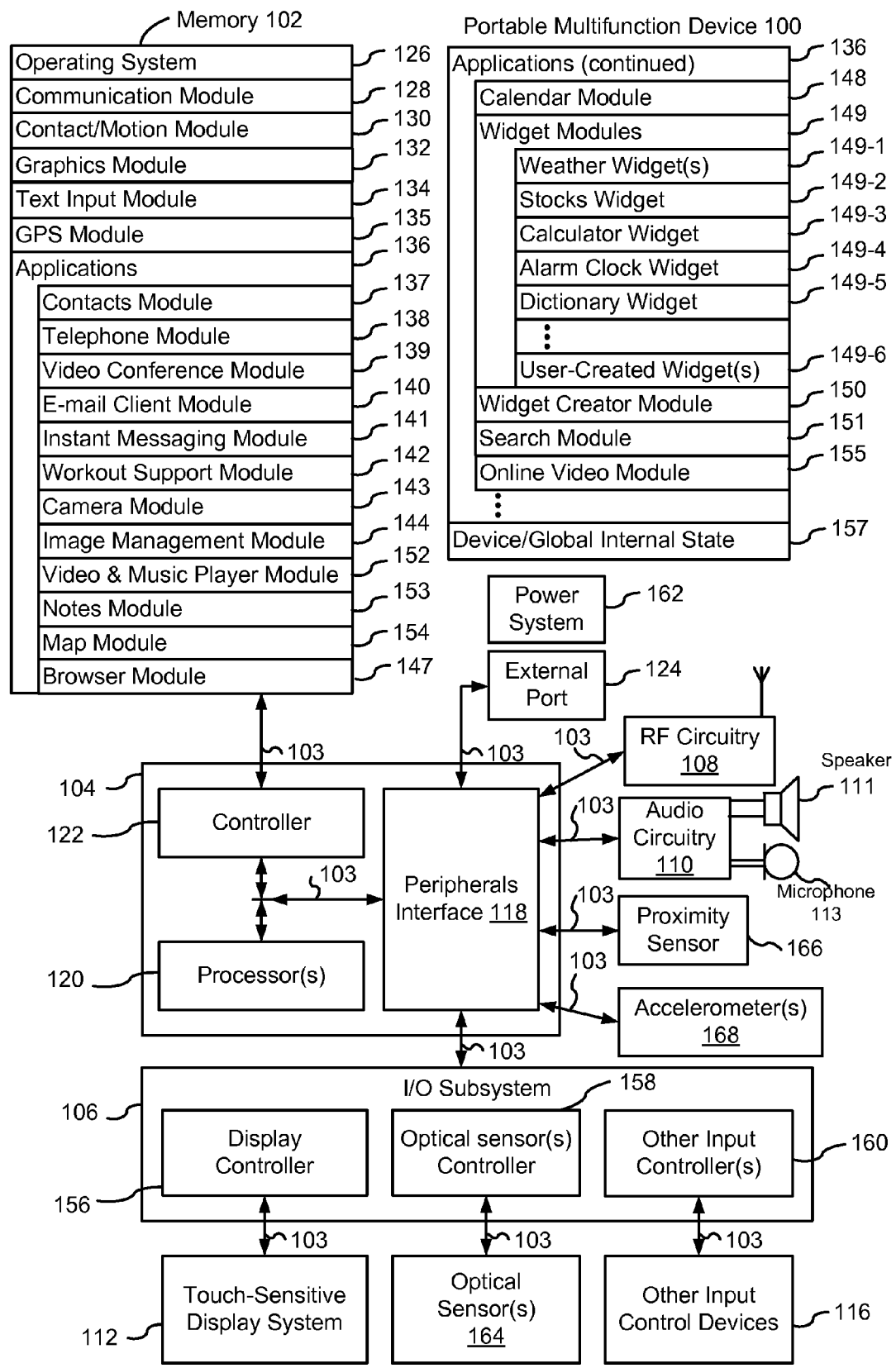
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts).

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen. By using a touch screen as the primary input control device for operation of device 100, the number of physical input control devices (such as push buttons, dials, and the like) on device 100 may be reduced.

The predefined set of functions that may be performed exclusively through a touch screen include navigation between user interfaces. In some embodiments, at least a portion of the touch screen, when touched by the user, navigates device 100 to a main, home, or root menu from any user interface that may be displayed on device 100. In such embodiments, the portion of the touch screen may be referred to as a "menu button." In some other embodiments, the menu button may be a physical push button or other physical input control device instead of a portion of the touch screen.

Figure 1B:
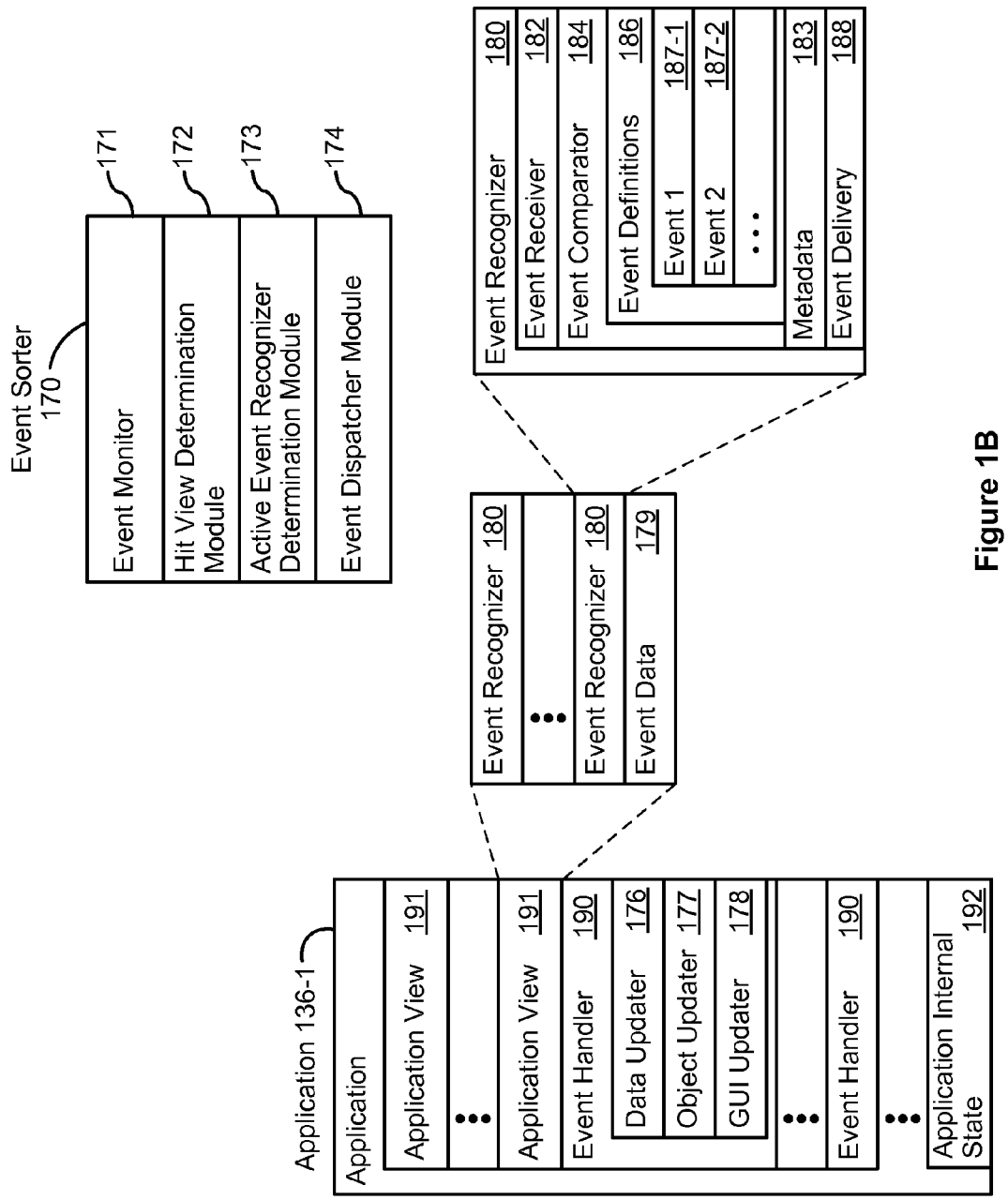
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising touch-sensitive display 355, which is also called herein a touch screen display. I/O interface 330 also may include a keyboard and/or mouse (or other pointing device) 350. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4 illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;

Settings 412, which provides access to settings for device 100 and its various applications 136; and Online video module 155, also referred to as YouTube (trademark of Google Inc.) module 155.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5T illustrate exemplary user interfaces managing and interacting with concurrently open applications in accordance with some embodiments. The user interfaces in these figures are used to illustrate the processes described below, including the processes in FIGS. 6A-6C.

As used in the specification and claims, the term "open application" refers to a software application with retained state information (e.g., as part of device/global internal state 157, FIG. 1A and/or application internal state 192, FIG. 1B). An open application is any one of the following types of applications:

an active application, which is currently displayed on display 112 (or a corresponding application view is currently displayed on the display);

a background application (or background process), which is not currently displayed on display 112, but one or more application processes (e.g., instructions) for the corresponding application are being processed by one or more processors 120 (i.e., running);

a suspended application, which is not currently running, and the application is stored in a volatile memory (e.g., DRAM, SRAM, DDR RAM, or other volatile random access solid state memory device of memory 102); and a hibernated application, which is not running, and the application is stored in a non-volatile memory with retained state information (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

FIGS. 5A-5I illustrate exemplary user interfaces for selecting applications and displaying corresponding application views.

FIG. 5A illustrates an exemplary user interface ("home screen") displaying a plurality of application icons 550 (e.g., 550-1 through 550-8) on touch screen 112-1 of a first electronic device (e.g., electronic device 100-1). Each application icon 550, when activated by a user, initiates launching a corresponding application and/or displaying a corresponding application view.

For example, a touch gesture (e.g., a tap gesture) on map application icon 550-7 initiates displaying map application view 502-1 (FIG. 5B) on touch screen 112-1 of first electronic device 100-1. Thereafter, the user may press home button 204 to return to the home screen (FIG. 5A), and select other applications. For example, the user may activate notes application icon 550-8 to display notes application view 502-2 (FIG. 5C) on touch screen 112-1 of first electronic device 100-1. Similarly, the user may, in turn, initiate display of calculator application view 502-3 (FIG. 5D), music application view 502-4 (FIG. 5E), calendar application view 502-5 (FIG. 5F), document application view 502-6 (FIG. 5G) corresponding to a word processing application (e.g., word processing module 384, FIG. 3), and web browser application view 502-7 (FIG. 5H). It is noted that calculator application view 502-3 that occupies the entire touch screen 112-1 includes a view of a scientific calculator (also called herein an engineering calculator or an advanced calculator).

In some embodiments, the selected applications for which corresponding application views have been displayed (e.g., map application, notes application, calculator application, music application, calendar application, document application, and web browser application) remain as open applications (as explained above). These open applications include most recently used applications and most recently selected applications, as defined below.

In some embodiments, opening a second application while in a first application closes the first application. For example, in some embodiments, requesting display of the notes application view 502-2 while in a map application includes closing the map application. In that case, the application that is currently displayed may be the only open application (e.g., web browser application) for the first electronic device. In such embodiments, the selected applications for which corresponding application views have been displayed (e.g., map application, notes application, calculator application, music application, calendar application, and document application) are most recently used applications or most recently selected applications, but not open applications.

In some embodiments, a user may select, while in a first application, whether or not to close the first application upon opening a second application. Thus, in some embodiments, most recently used applications or most recently selected applications include one or more open applications and one or more closed applications (e.g., applications that are not open applications).

As used herein, the term "most recently selected applications" refer to applications for which corresponding application views have been most recently displayed. As used herein, the term "most recently used applications" refer to applications for which corresponding application views have been most recently displayed and a user has interacted with the corresponding application views (e.g., scroll the application view or manipulate a user interface object, such as a button, in the application view). Thus, most recently selected applications include most recently used applications.

In FIG. 5H, input 505 (e.g., a click or double-click on home button 204) is detected. Alternatively, a predefined touch gesture (e.g., multi-finger swipe up gesture, such as a four-finger swipe up gesture) on touch screen 112-1 may be detected as the input.

Figure 5I:
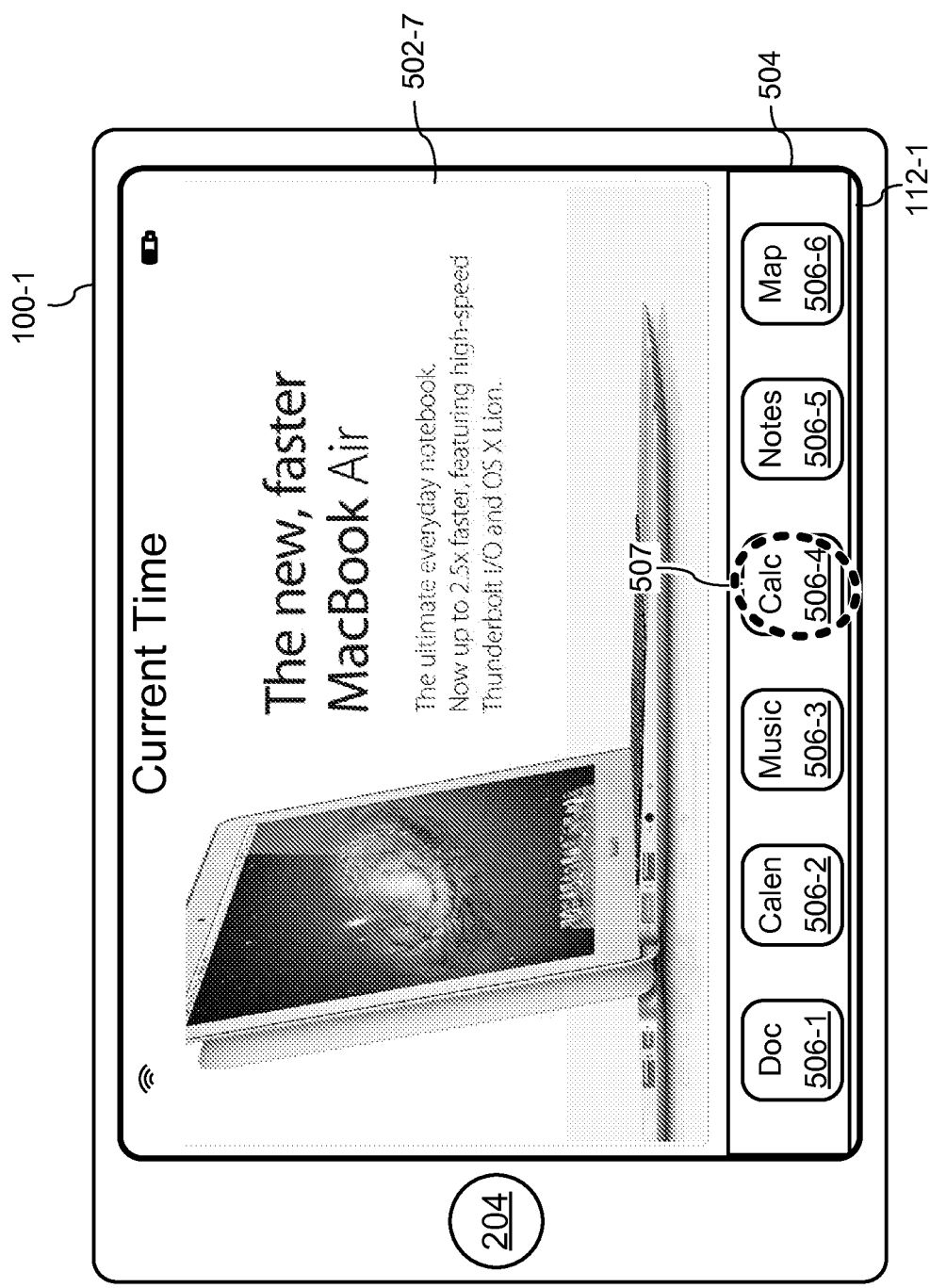

FIG. 5I illustrates that, in response to detecting input 505 (FIG. 5H), a portion of web browser application view 502-7 and application icon area 504 are concurrently displayed. In some embodiments, in response to detecting input 505, the device enters into an application selection and popup interaction mode for selecting one of the applications for display of a corresponding application view and interacting with one or more popup views, and the portion of web browser application view 502-7 and application icon area 504 are concurrently displayed as part of the application selection and popup interaction mode. Application icon area 504 includes application icons for open applications and/or most recently selected applications (or most recently used applications) 506. In this example, application icon area 504 includes application icons for a document application, a calendar application, a calculator application, a music application (iPod), a notes application, and a map application. Note that these applications are merely exemplary, and application icon area 504 can include other types of applications, such as one or more of applications 136 shown in FIG. 1A (e.g., contacts 137, telephone 138, video conferencing 139, e-mail 140, instant messaging 141, etc.).

In some embodiments, the concurrent display of the web browser application view and the application icon area may include an animation. For example, the web browser application view can slide up such that a portion of the web browser application view moves off the display and a portion of the web browser application view remains on the display. The application icon area can slide in simultaneously from the bottom of the screen such that the animation gives a visual appearance that the web browser application view and the application icon area are connected.

FIG. 5I also illustrates that touch gesture 507 of a first type (e.g., a tap gesture) is detected on calculator application icon 506-4 on touch screen 112-1.

Figure 5J:
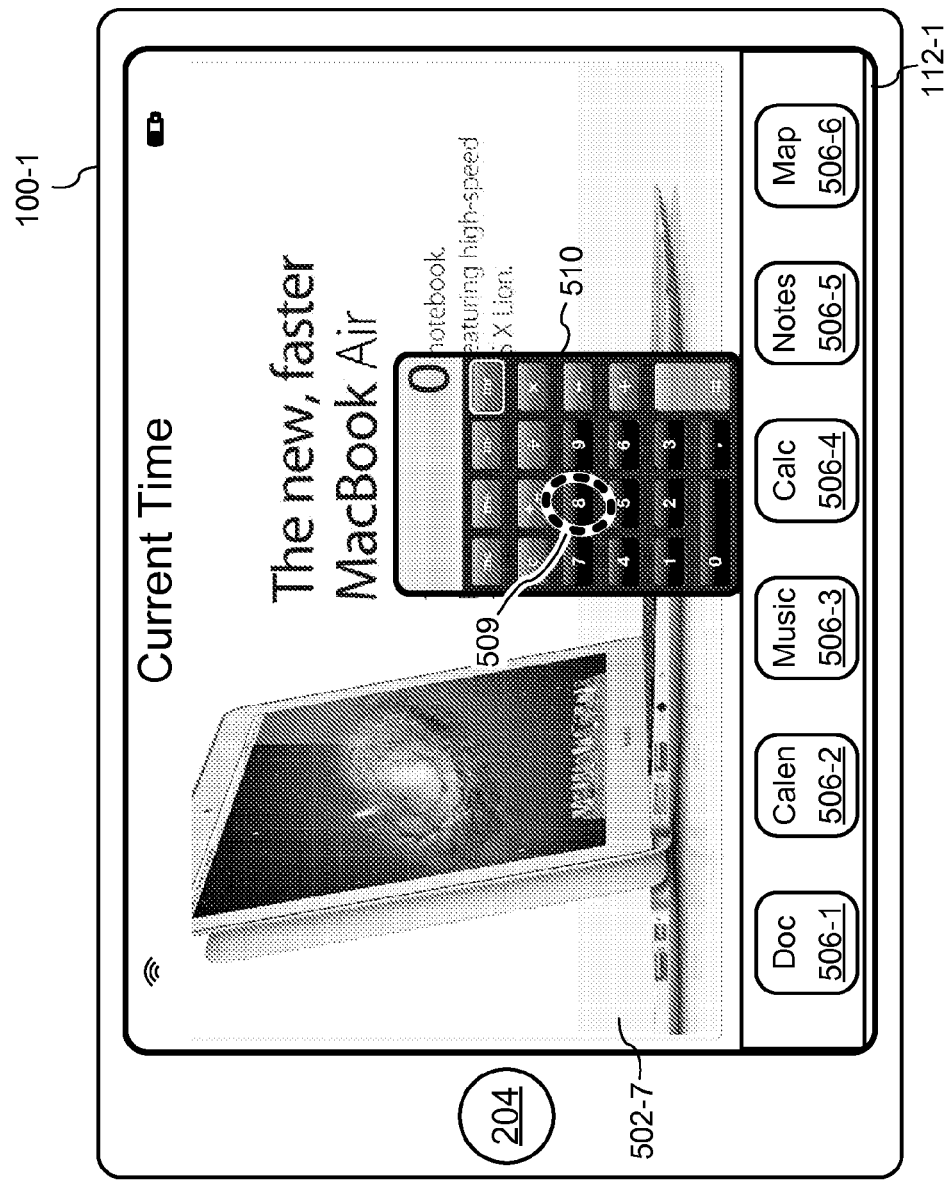
Figure 5J:
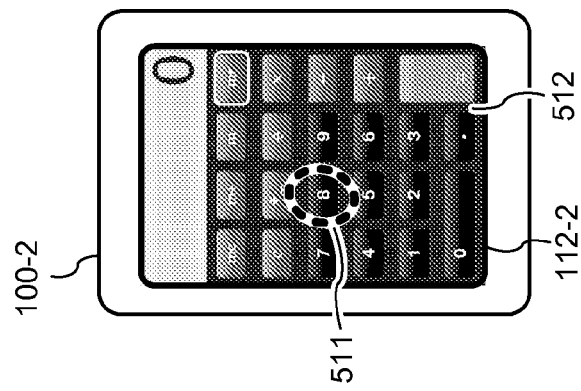

FIG. 5J illustrates that, in response to detecting touch gesture 507 of the first type on calculator application icon 506-4, a calculator application view is displayed in popup view 510 on touch screen 112-1 of first electronic device 100-1. In FIG. 5J, the calculator application view in popup view 510 is a basic calculator view (also called herein a simple calculator view), which has fewer keys (or user interface objects) than scientific calculator application view 502-3 (FIG. 5D). For comparison, exemplary user interface 512 for a corresponding calculator application on touch screen 112-2 of second electronic device 100-2 is also depicted. In some embodiments, second electronic device 100-2 is a mobile phone device, which typically has smaller touch screen 112-2 than touch screen 112-1 of first electronic device 100-1. Touch screen 112-2 of second electronic device 100-2 has a lower resolution than touch screen 112-1 of first electronic device 100-1. In one example, touch screen 112-1 has a resolution that is two times the resolution of touch screen 112-2 (i.e., twice as many pixels in the lateral or horizontal dimension and twice as many pixels in the vertical dimension, for a total of four times as many pixels, as touch screen 112-2). In another example, touch screen 112-1 has a resolution that is more than two times the resolution of touch screen 112-2, for example, three times as many pixels in the horizontal dimension and three times as many pixels in the vertical dimension as touch screen 112-2.

In FIG. 5J, popup view 510 partially covers the portion of web browser application view 502-7. In some embodiments, popup view 510 partially covers the application icon area as well as the portion of web browser application view 502-7. Popup view 510 corresponds to full-screen-width view 512 of the corresponding calculator application on second electronic device 100-2 with touch-sensitive display 112-2.

As used herein, the term "full-screen-width view" in an application on a display refers to a view that occupies all or substantially all of the width of the display (e.g., at least 80%, 85%, 90% or 95% of the width of the display). Note that a full-screen-width view does not necessarily occupy the full-screen height of the display. For example, full-screen-width views include a first view that occupies the entire screen of a display (i.e., full-screen-width and full-screen-height view) as well as a second view that occupies the full-screen-width yet half-screen-height area of the display.

FIG. 5J also illustrates that touch gesture 509 (e.g., a tap gesture) is detected within popup view 510 displayed on touch screen 112-1 of first electronic device 100-1 (e.g., at a location that corresponds to an "8" button icon). A corresponding touch gesture 511 (e.g., a tap gesture) may be detected on calculator application view 512 that is displayed on touch screen 112-2 of second electronic device 100-2.

Figure 5K:
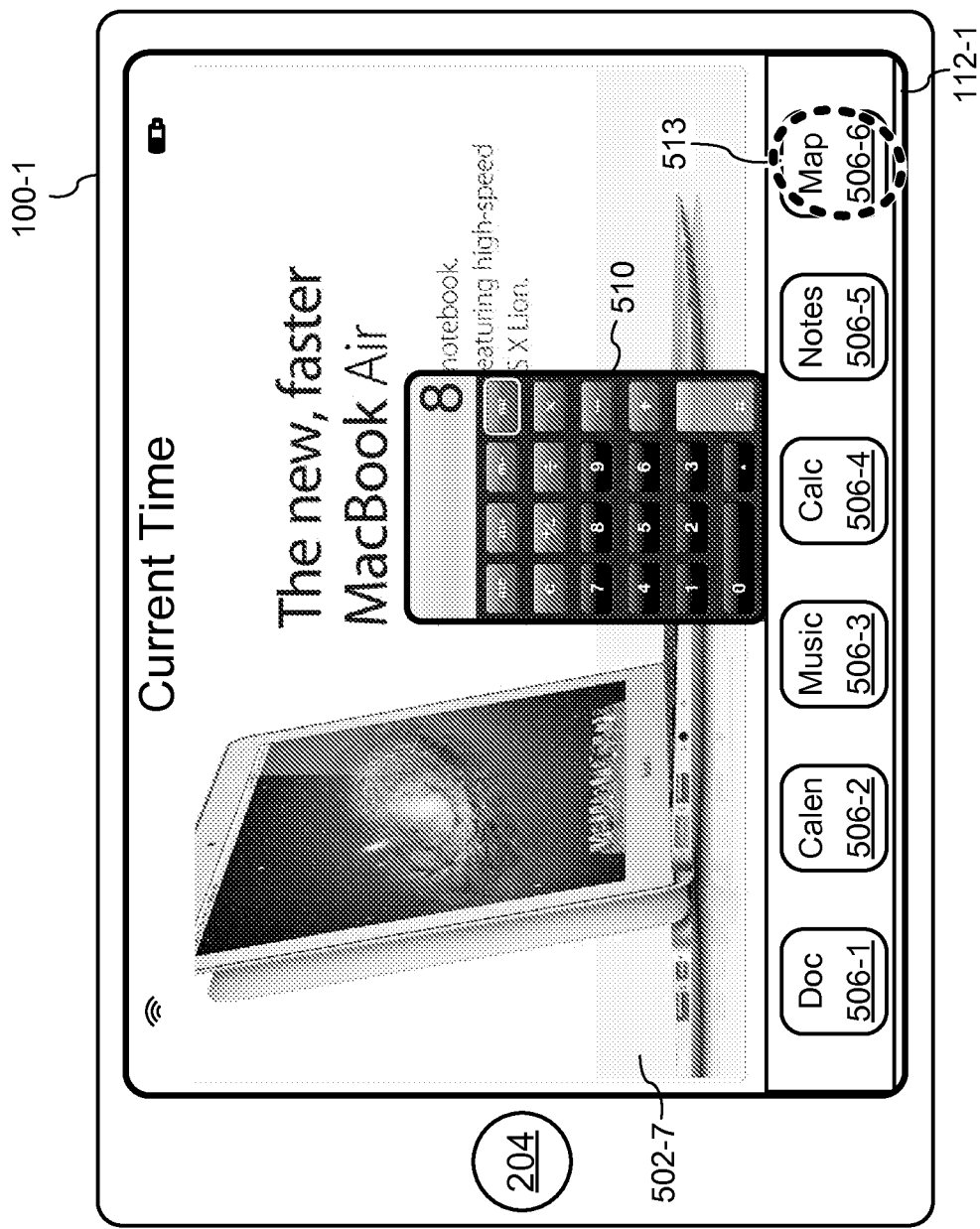
Figure 5K:
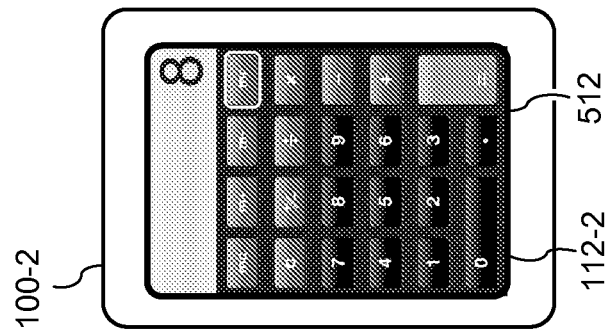

FIG. 5K illustrates that, in response to touch gesture 509 (FIG. 5J), the calculator application view in popup view 510 is updated (e.g., the number 8 that corresponds to the location of touch gesture 509 is displayed in the calculator application view in response to touch gesture 509). In some embodiments, application internal state 192 (FIG. 1B) of calculator application 149-3 (FIG. 1A) is updated to store the number displayed in the calculator application view (e.g., the number 8). Similarly, in response to touch gesture 511 (FIG. 5J), calculator application view 512 displayed on touch screen 112-2 of second electronic device 100-2 is updated (e.g., the number 8 that corresponds to the location of touch gesture 511 is displayed in the calculator application view 512 in response to touch gesture 511).

In FIG. 5K, touch gesture 513 of the first type (e.g., a tap gesture) is detected on map application icon 506-6 while popup view 510 is displayed on touch screen 112-1.

Figure 5L:
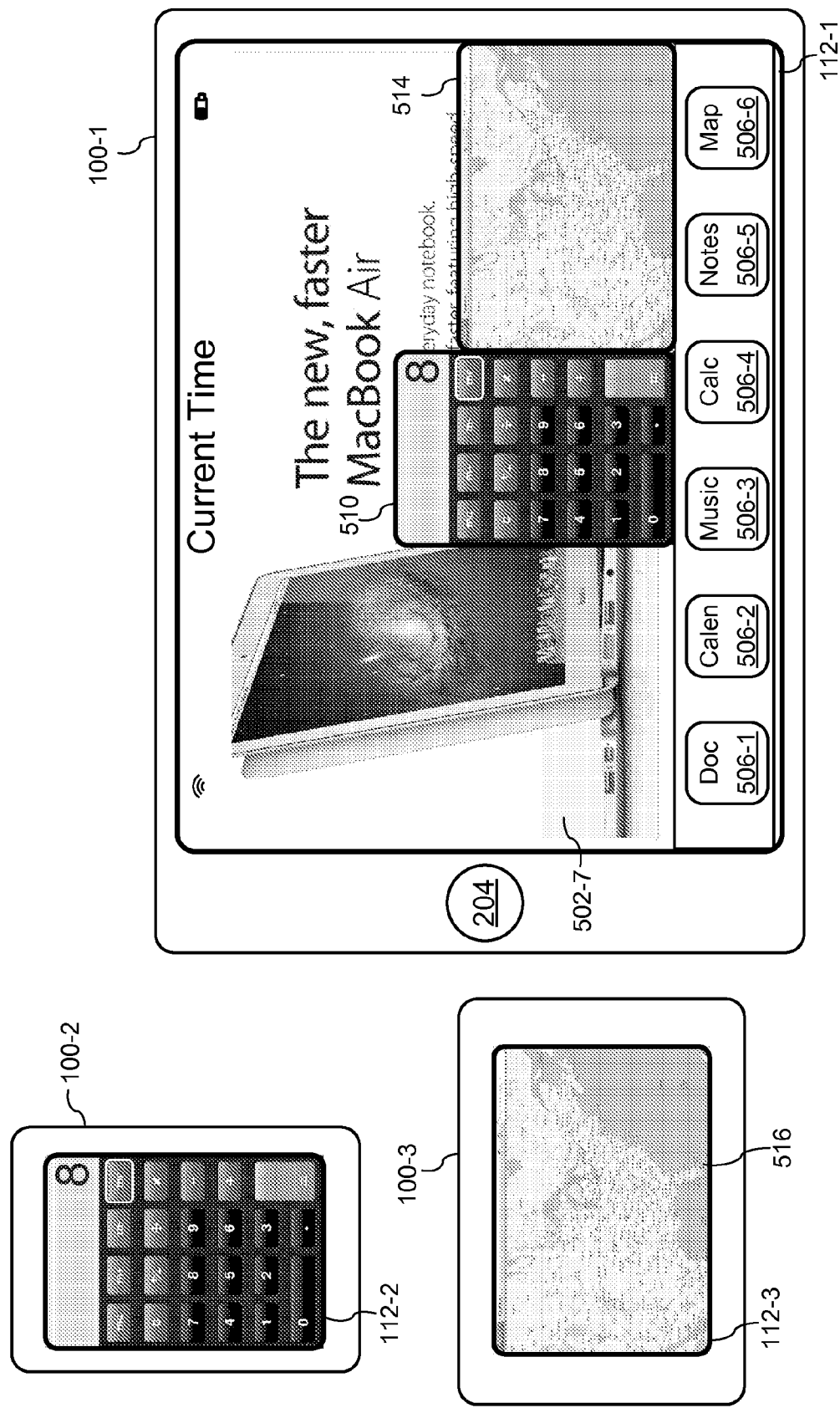

FIG. 5L illustrates that, in response to detecting touch gesture 513 (FIG. 5K), second popup view 514 is displayed on touch screen 112-1 of first electronic device 100-1. Second popup view 514 includes a map application view for a map application (e.g., map module 154, FIG. 1A). For comparison, exemplary user interface 516 for a corresponding map application on touch screen 112-3 of third electronic device 100-3 is also depicted. In some embodiments, third electronic device 100-3 is a tablet device, the touch screen 112-3 of which is typically smaller than touch screen 112-1 of first electronic device 100-1 and larger than touch screen 112-2 of second electronic device (e.g., a mobile phone device). Second popup view 514 corresponds to full-screen-width view 516 of a corresponding map application on third electronic device 100-3 with touch-sensitive display 112-3.

Although FIG. 5L illustrates second popup view 514 that corresponds to full-screen-width view 516 of the corresponding map application on third electronic device 100-3 with touch-sensitive display 112-3, in some embodiments, second popup view 514 corresponds to a full-screen-width view of a corresponding map application on second electronic device 100-2, instead of third electronic device 100-3. In some embodiments, a respective application view has a preselected corresponding electronic device (e.g., a mobile phone or a tablet device), and the respective application view is at least initially displayed in accordance with a resolution of the preselected corresponding electronic device.

As shown in FIG. 5L, second popup view 514 is displayed in a landscape orientation. In some embodiments, a respective application view has a predefined orientation, and the respective application view is at least initially displayed in the predefined orientation. For example, the predefined orientation of the calculator application view may be portrait, and the predefined orientation of the map application view may be landscape.

In some embodiments, second popup view 514 is configured to receive user inputs (e.g., swipe gestures on the map)

and update states of a corresponding application (e.g., by scrolling the map), thereby enabling user interaction with second popup view 514.

As described above, FIGS. 5K-5L illustrate a touch gesture of the first type that initiates displaying an application view in a popup view. In comparison, FIGS. 5M-5N illustrate a touch gesture of a second type that initiates displaying a full-screen application view.

Figure 5M:
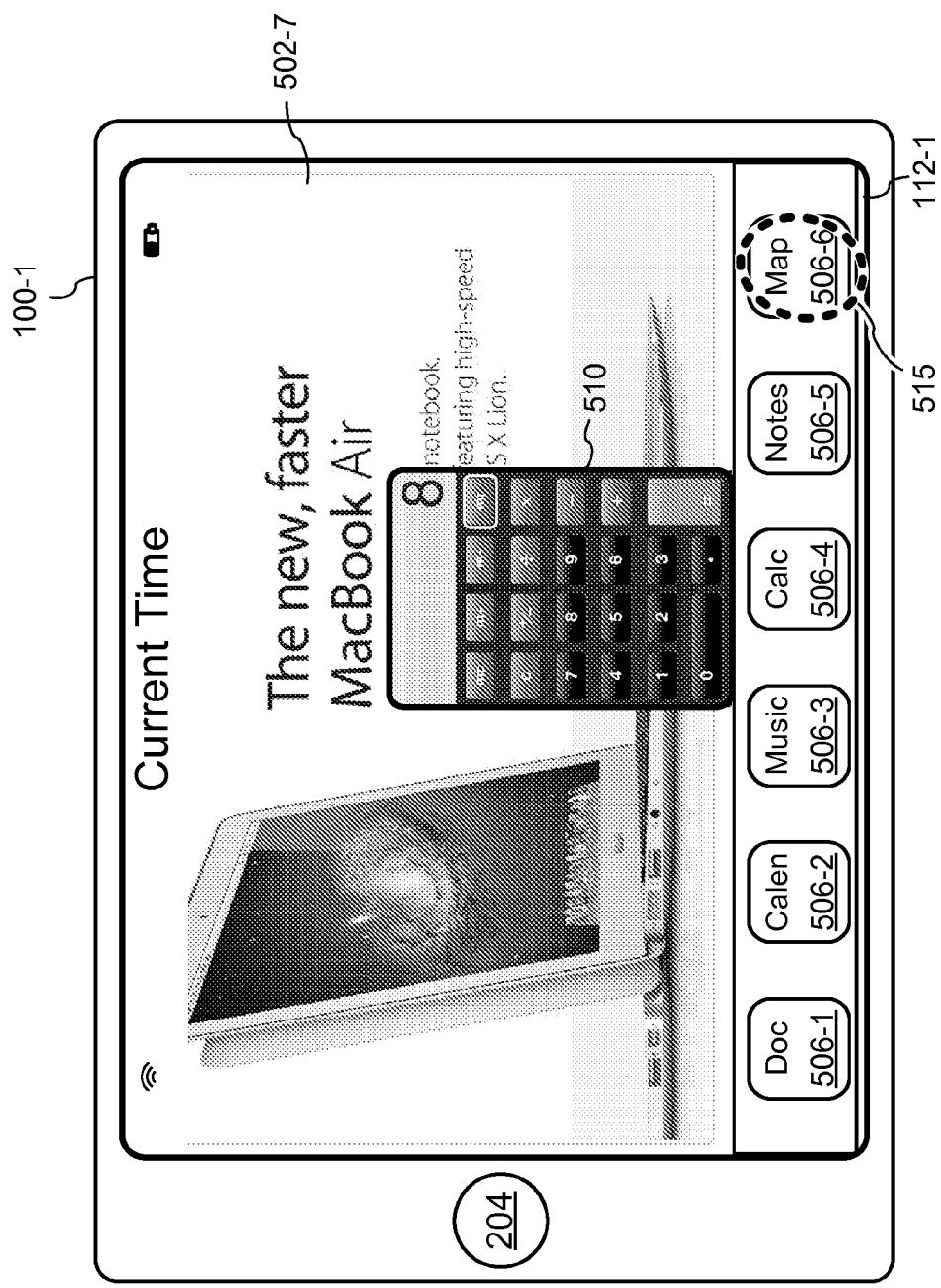

In FIG. 5M, touch gesture 515 of the second type (e.g., a tap-and-hold gesture) is detected on map application icon 506-6. Alternatively, a swipe gesture (e.g., a swipe-up gesture) or any other gesture distinct from touch gesture 513 of the first type may be used. As used herein, a tap-and-hold gesture refers to a gesture that includes contacting a finger on touch screen 112, followed by maintaining the finger contact on touch screen 112 for at least predetermined duration (e.g., 0.2, 0.3, 0.5, or 1 second). In some embodiments, the tap-and-hold gesture also includes lift-off of the finger contact off touch screen 112 after maintaining the finger contact on touch screen 112 for at least the predetermined duration. For example, the operation described with respect to FIG. 5N may not be performed until the finger contact in touch gesture 515 is lifted off touch screen 112.

Figure 5N:
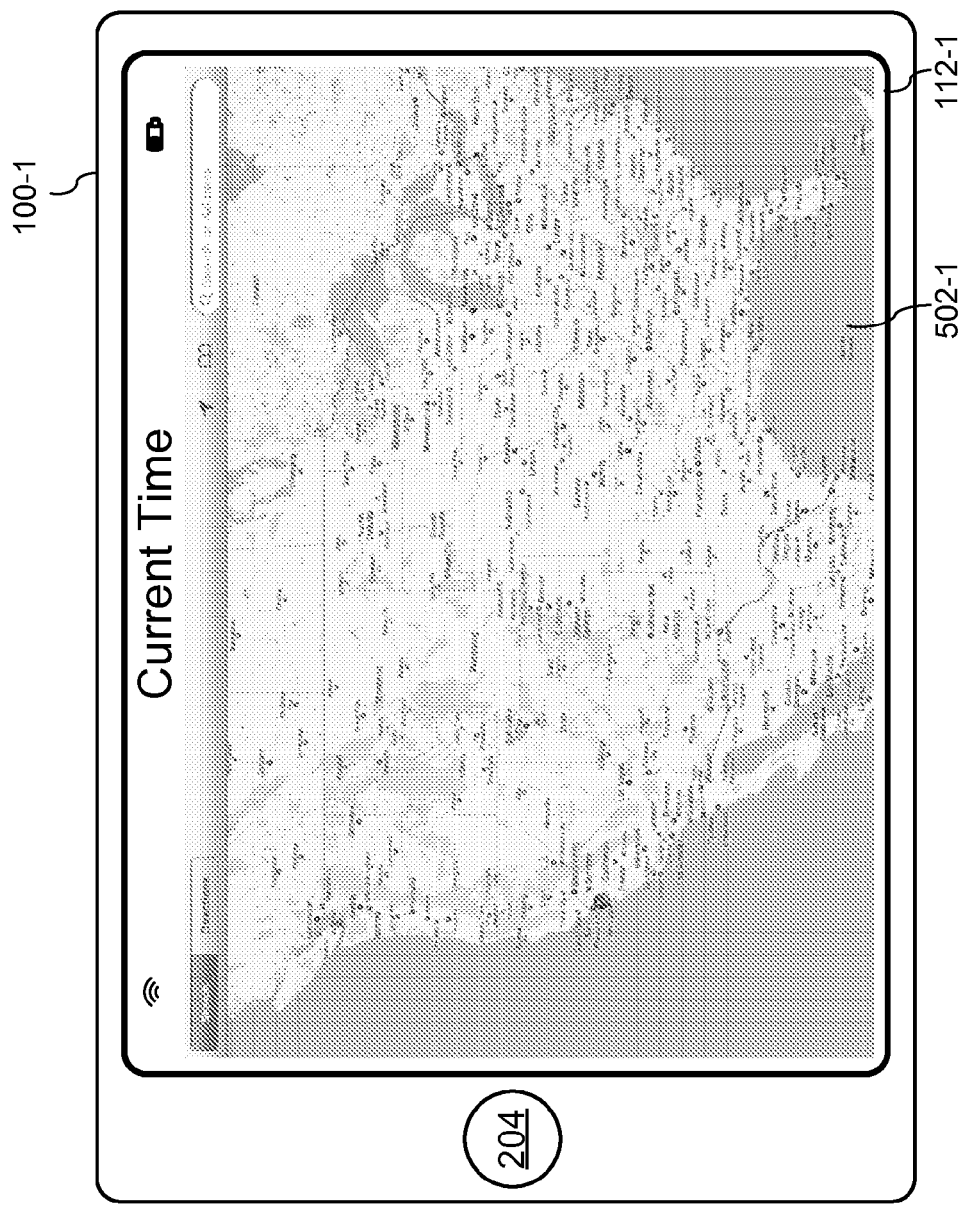

FIG. 5N illustrates that, in response to detecting touch gesture 515 of the second type (FIG. 5M), map application view 502-1 that occupies the entire display area of touch screen 112-1 (which, in some embodiments, refers to the entire application view area of touch screen 112-1 corresponding to the entire display area of touch screen 112-1 less a header area that is used for displaying the current time and other system status indicators) is displayed. Thus, a user may choose to display an application view in a popup view (e.g., FIGS. 5K-5L) or in full-screen (e.g., FIGS. 5M-5N) by using a touch gesture of the first type or a touch gesture of the second type, respectively.

Similarly, a full-screen application view for a respective application corresponding to any one of the displayed application icons 506 may be displayed in response to a similar touch gesture. For example, in response to detecting a touch gesture of the second type on calculator application icon 506-4, a full-size calculator application view is displayed on touch screen 112-1 in some embodiments.

Although FIGS. 5M-5N illustrate that the touch gesture of the second type (e.g., touch gesture 515, FIG. 5M) is performed while a popup view is displayed (e.g., popup view 510), the touch gesture of the second type may be performed to display a full-size (or full-screen) application view even when no popup view is displayed.

Figure 5O:
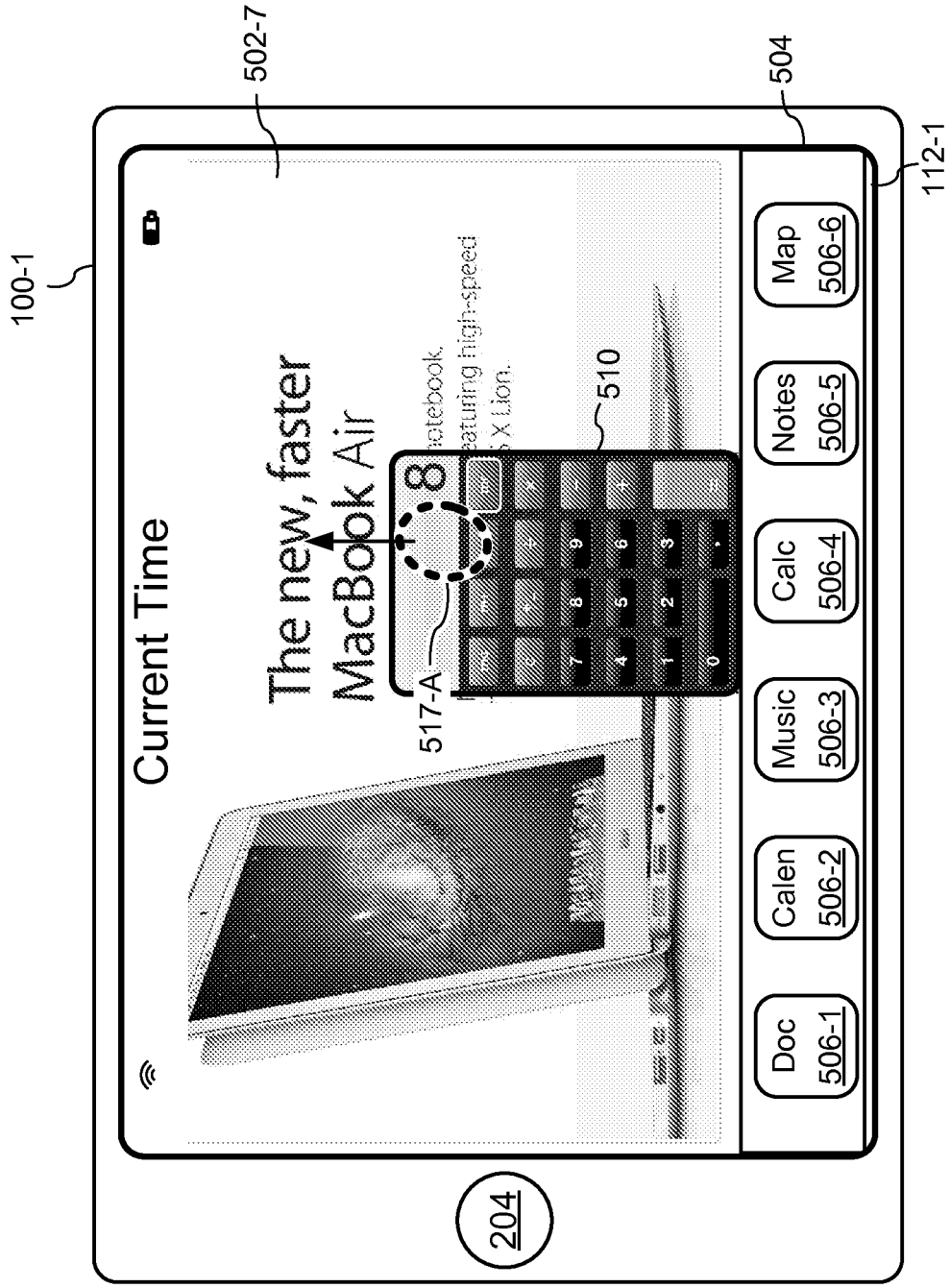
Figure 5P:
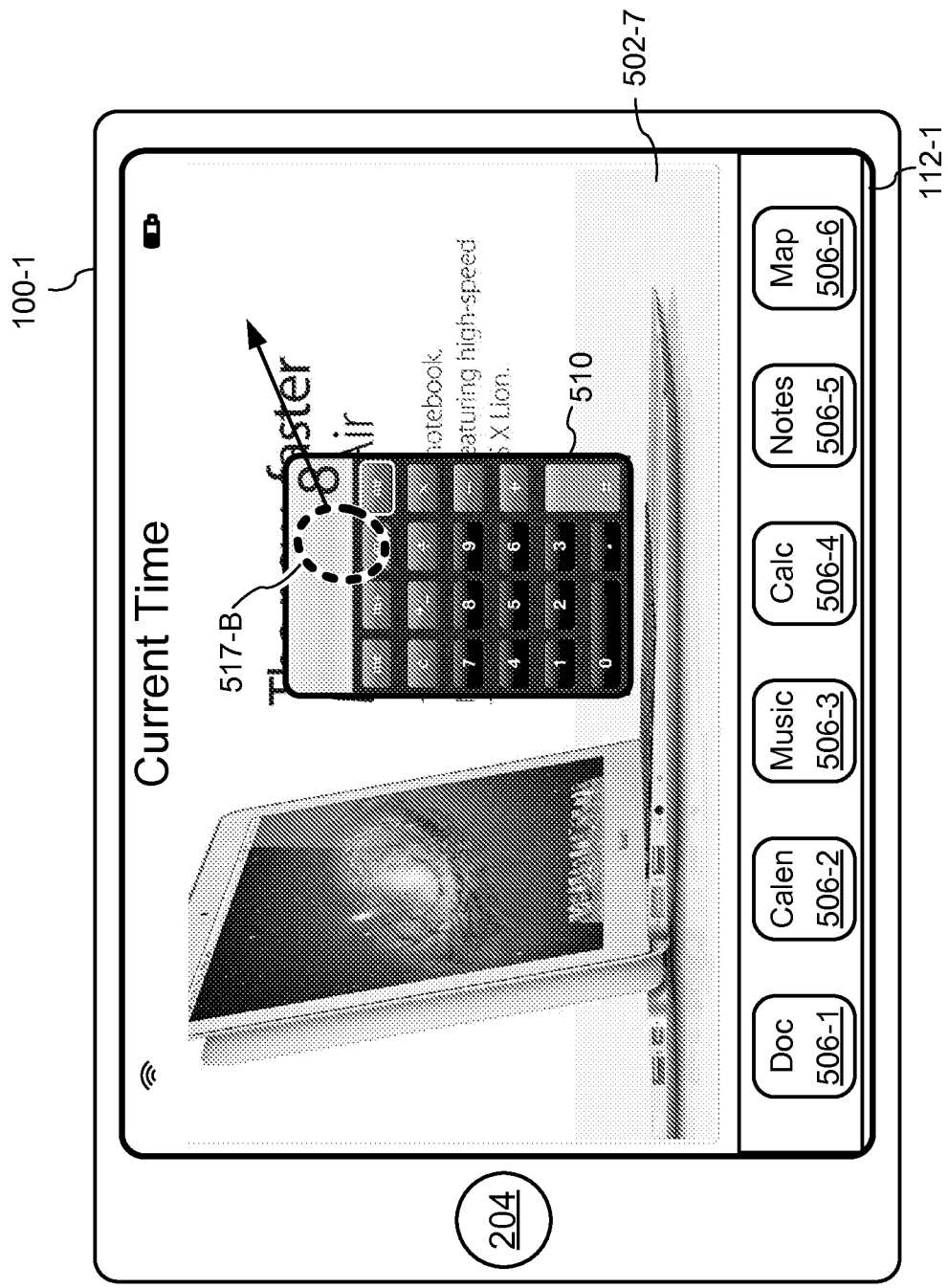
Figure 5Q:
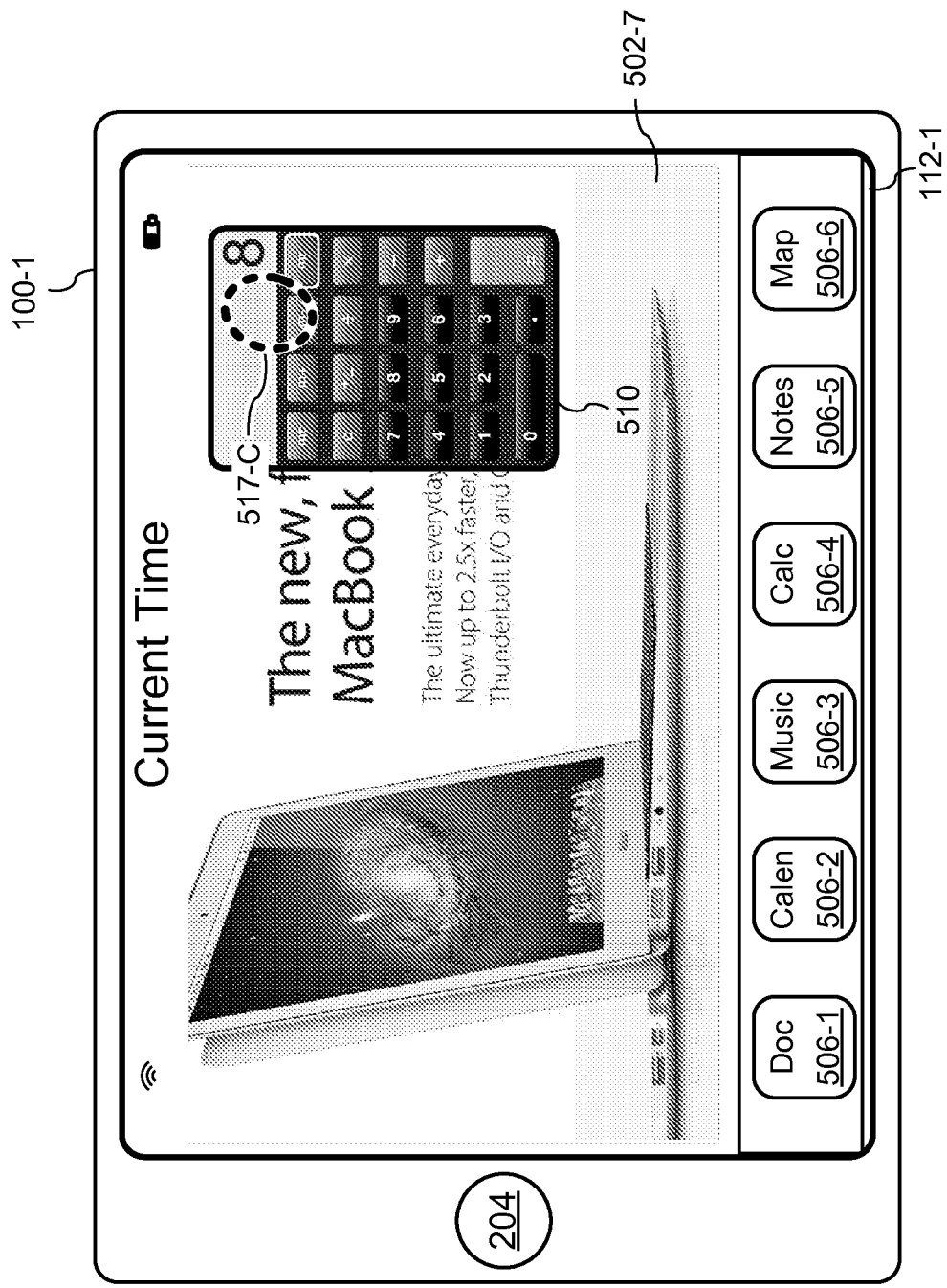

FIGS. 5O-5Q illustrate that, in some embodiments, popup view 510 moves in accordance with another touch gesture.

In FIG. 5O, popup view 510 is displayed adjacent to application icon area 504. FIG. 5O also illustrates that touch gesture 517-A (e.g., a tap-and-hold gesture) is detected on popup view 510, and the device enters into a popup view moving mode. Alternatively, the device may enter into the popup view moving mode in response to detecting a touch gesture (e.g., a tap gesture) on popup view 510 at a location that does not correspond to any user interactive object in popup view 510 (e.g., the display panel of the calculator application view). In FIGS. 5P-5Q, touch gesture 517-A moves to 517-B and then to 517-C, and popup view 510 moves in accordance with the movement of touch gesture 517.

Figure 5R:
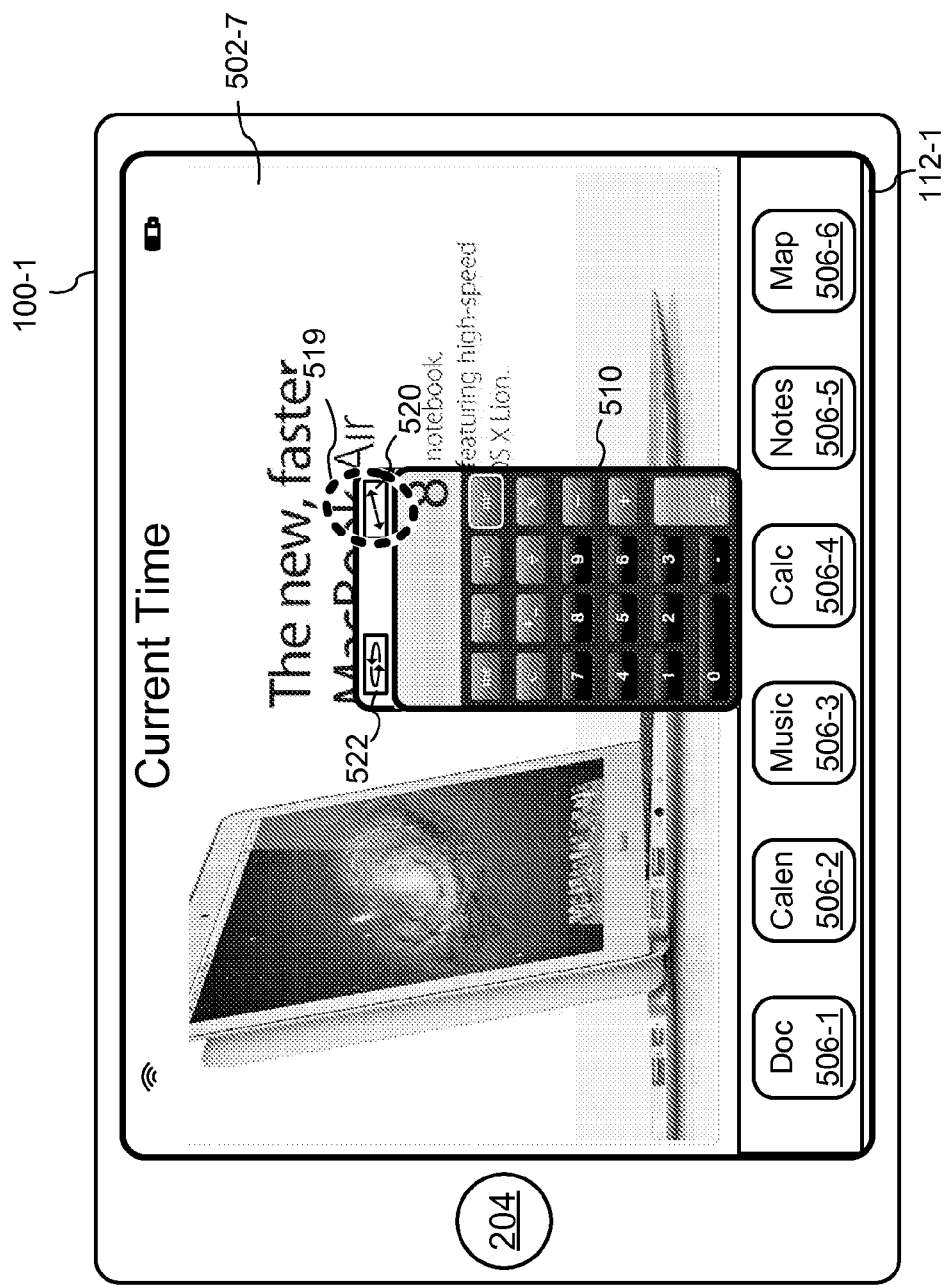
Figure 5R:
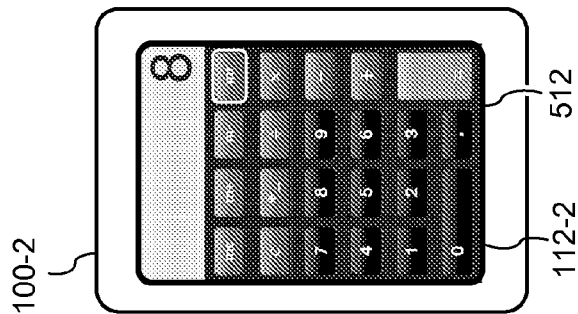
Figure 5S:
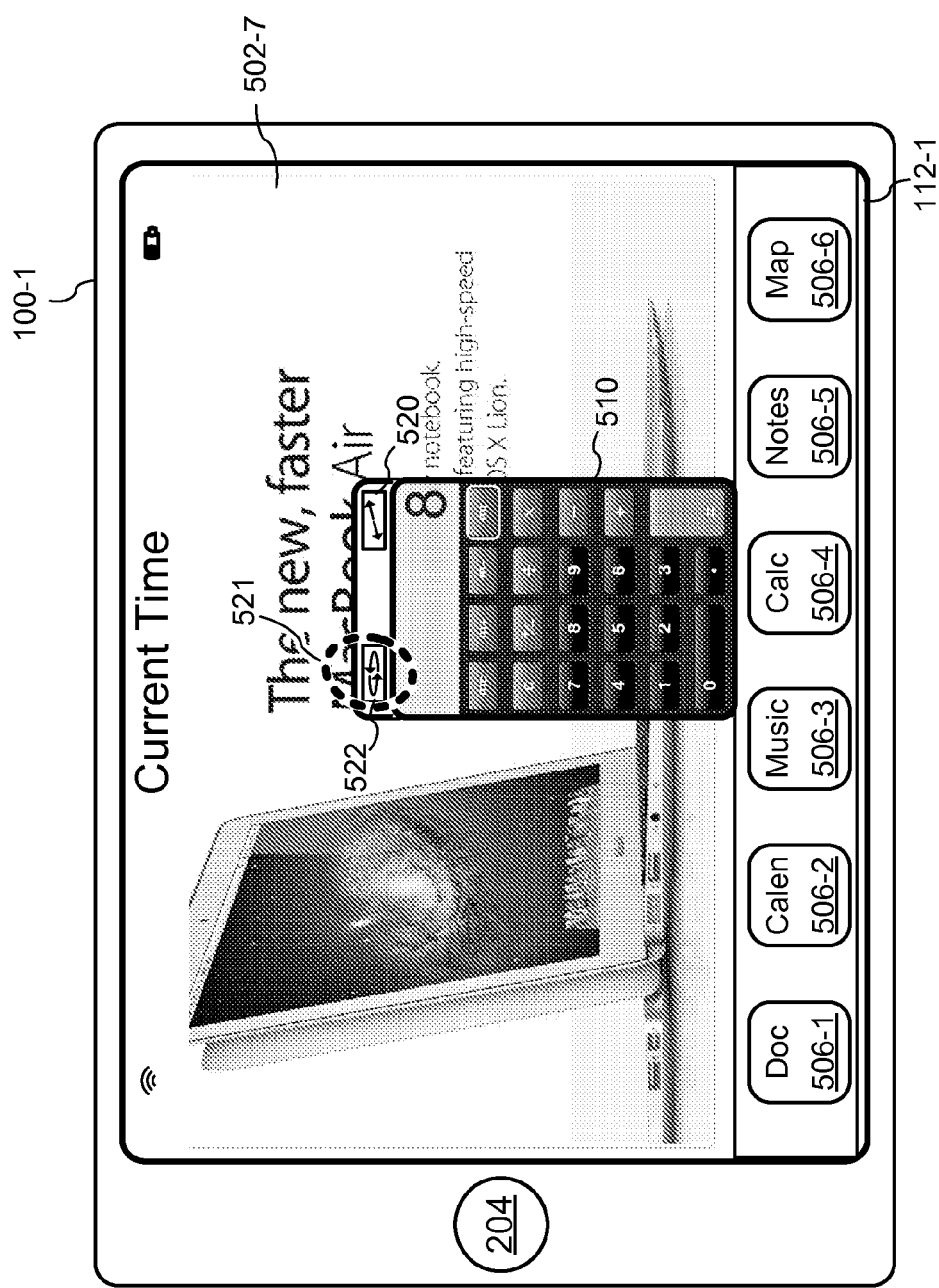
Figure 5S:
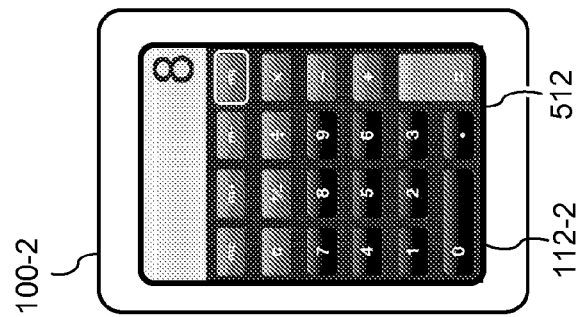
Figure 5T:
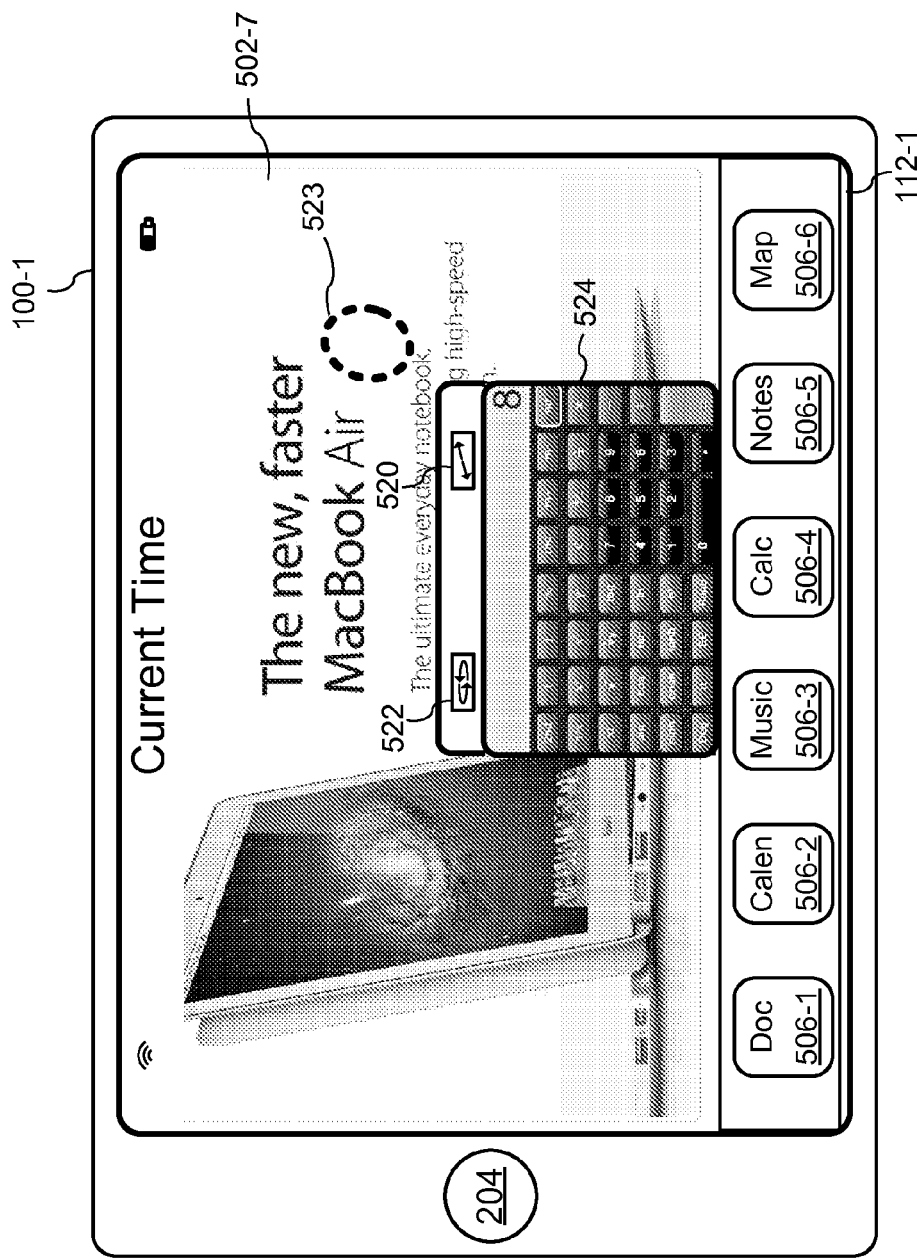
Figure 5T:
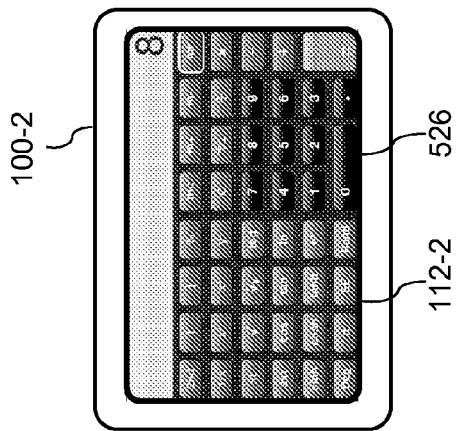
Figure 6A:
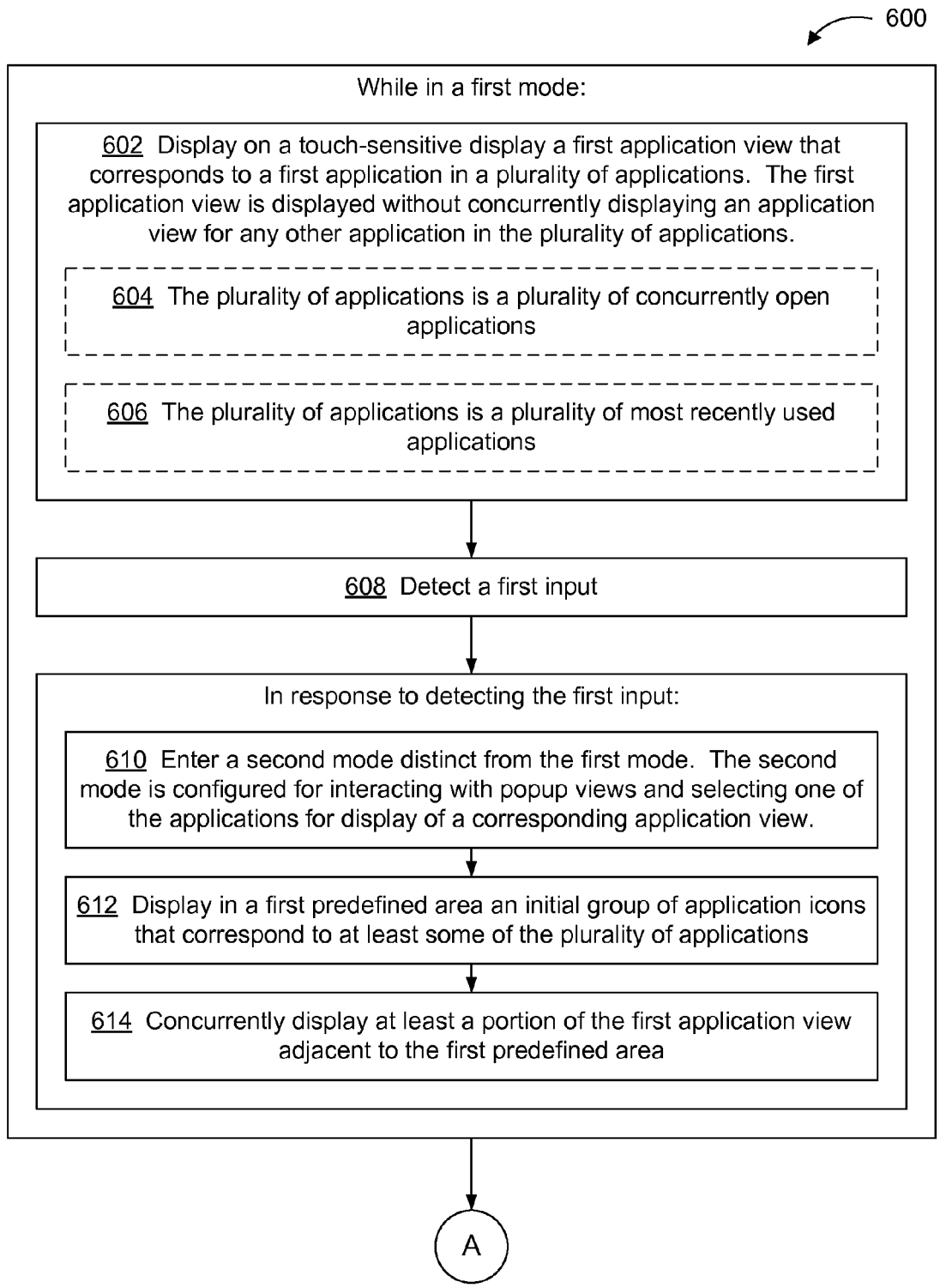
Figure 6B:
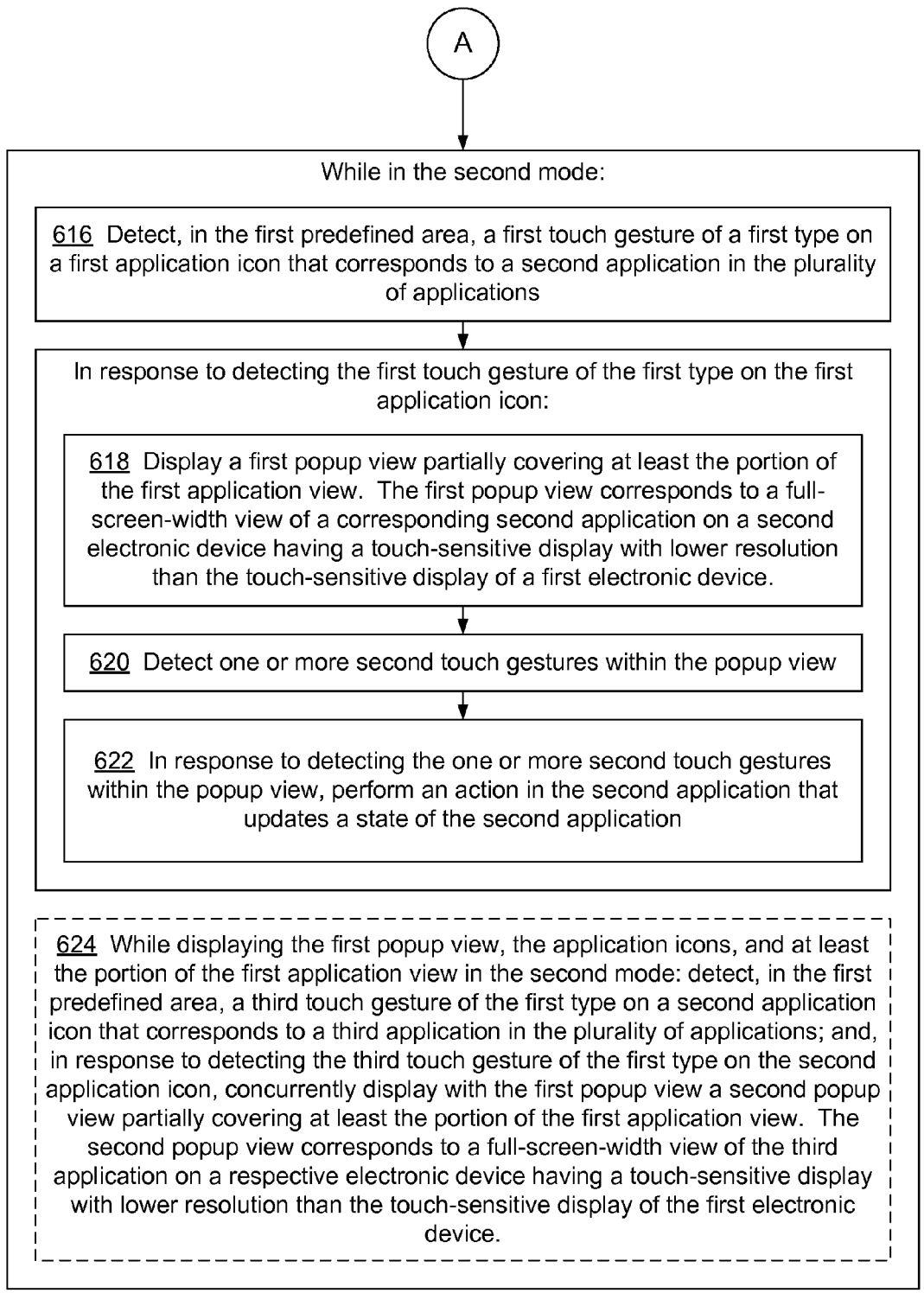

FIGS. 5R-5T illustrate popup views with associated user interface objects.

FIG. 5R illustrates that popup view 510 includes full-screen user interface object 520 (also called herein a full-screen icon) and rotation user interface object 522 (also called herein a rotation icon). In FIG. 5R, touch gesture 519 (e.g., a tap gesture) is detected on full-screen user interface object 520 of popup view 510. In response to detecting touch gesture 519 on full-screen user interface object 520 of popup view 510, calculator application view 502-3 that occupies the entire display area of touch screen 112-1 is displayed (e.g., FIG. 5D). In displaying the entire calculator application view, in some embodiments, the calculator application view changes from a simple calculator application view when displayed in popup view 510 to a scientific calculator application view when displayed full screen on touch screen 112-1.

In FIG. 5S, touch gesture 521 (e.g., a tap gesture) is detected on rotation user interface object 522 of portrait popup view 510. For comparison, exemplary user interface 512 for a corresponding calculator application on touch screen 112-2 of second electronic device 100-2 in a portrait orientation is also depicted.

FIG. 5T illustrates that, in response to detecting touch gesture 521 on rotation user interface object 522 of portrait popup view 510, portrait popup view 510 rotates so that it is displayed as landscape popup view 524 (or display of portrait popup view 510 is replaced with display of landscape popup view 524). In FIG. 5T, landscape popup view 524 includes a scientific calculator application view. For comparison, exemplary user interface 526 for a corresponding calculator application on touch screen 112-2 of second electronic device 100-2 in a landscape orientation is also depicted. By rotating second electronic device 100-2 from the portrait orientation to the landscape orientation, the displayed calculator application view changes from the simple calculator application view 512 (FIG. 5S) to the scientific calculator application view 526 (FIG. 5T) on second electronic device 100-2.

FIG. 5T also illustrates that finger gesture 523 is detected at a location that does not correspond to any popup view or any application icon. In response to detecting finger gesture 523 that does not correspond to any popup view or any application icon, the application selection and popup interaction mode is terminated, and web browser application view 502-7 is displayed so that web browser application view 502-7 occupies the entire display area of touch screen 112-1 (FIG. 5H).

Alternatively, pressing home button 204 may initiate exiting the application selection and popup interaction mode, and displaying entire web browser application view 502-7 (FIG. 5H).

FIGS. 6A-6C are flow diagrams illustrating method 600 of managing and interacting with concurrently open applications in accordance with some embodiments. Method 600 is performed at a first electronic device (e.g., device 300, FIG. 3, or portable multifunction device 100, FIG. 1) with a touch-sensitive display that includes a display and a touch-sensitive surface on the display. Some operations in method 600 may be combined and/or the order of some operations may be changed.

As described below, method 600 provides an intuitive way to manage and interact with concurrently open applications using popup views. The method reduces the cognitive burden on a user when managing and interacting with concurrently open applications, thereby creating a more efficient human-machine interface. For battery-operated electronic devices, enabling a user to manage and interact with concurrently open applications faster and more efficiently conserves power and increases the time between battery charges.

While in a first mode (e.g., a single application view mode), the first electronic device displays (602) on the touch-sensitive display a first application view that corresponds to a first application in a plurality of applications (e.g., web browser application view 502-7, FIG. 5H). The first application view is displayed without concurrently displaying an application view for any other application in the plurality of applications. For example, in FIG. 5H, web browser application view 502-7 occupies the entire display area of touch screen 112-1 less a predefined region used to display the current time and device status icons, and no other application view is displayed on touch screen 112-1.

In some embodiments, the plurality of applications is (604) a plurality of concurrently open applications. In some embodiments, the plurality of applications includes one or more concurrently open applications. In some embodiments, the first electronic device maintains a list of concurrently open applications.

In some embodiments, the plurality of applications is (606) a plurality of most recently used applications. In some embodiments, the plurality of applications includes one or more most recently used applications. In some embodiments, the first electronic device maintains a list of most recently used applications. In some embodiments, the plurality of applications includes one or more most recently selected applications.

The first electronic device detects (608) a first input (e.g., click or double-click 505 on home button 204, FIG. 5H, or a predefined gesture on touch screen 112-1, such as a four-finger swipe up gesture).

In response to detecting the first input, the first electronic device enters (610) a second mode distinct from the first mode (e.g., an application selection and popup interaction mode, which is distinct from the single application view mode). The second mode is configured for interacting with popup views and selecting one of the applications for display of a corresponding application view.

Also in response to detecting the first input, the first electronic device displays (612) in a first predefined area (e.g., application icon area 504, FIG. 5I) an initial group of application icons that correspond to at least some of the plurality of applications (e.g., application icons 506-1 through 506-6), and concurrently displays (614) at least a portion of the first application view adjacent to the first predefined area (e.g., a portion of web browser application view 502-7). In some embodiments, the application icons are open application icons (e.g., application icons corresponding to open applications). In some embodiments, the application icons are most recently used application icons (e.g., application icons corresponding to most recently used applications). In some embodiments, the application icons are most recently selected application icons (e.g., application icons corresponding to most recently selected applications).

While in the second mode, the first electronic device detects (616, FIG. 6B), in the first predefined area, a first touch gesture of a first type (e.g., a tap gesture) on a first application icon that corresponds to a second application in the plurality of applications (e.g., calculator application icon 506-4 corresponds to a calculator application, FIG. 5I).

In response to detecting the first touch gesture of the first type on the first application icon, the first electronic device displays (618) a first popup view partially covering at least the portion of the first application view (e.g., popup view 510 partially covers the displayed portion of web browser application view 502-7, FIG. 5J). The first popup view corresponds to a full-screen-width view of a corresponding second application on a second electronic device having a touch-sensitive display with lower resolution than the touch-sensitive display of the first electronic device (e.g., popup view 510 corresponds to full-screen-width view 512 of a corresponding calculator application on second electronic device 100-2, such as a mobile phone device, FIG. 5J). In some embodiments, the number of pixels corresponding to the first popup view matches the number of pixels corresponding to the full-screen-width view of the corresponding second application on the second electronic device (e.g., when the touch-sensitive display of the second electronic device has 320×480-pixel resolution, the first popup view occupies a 320-pixel-by-480-pixel area on the touch-sensitive display of the first electronic device. Because the resolution of the first popup view matches the resolution of the full-screen-width view of the corresponding application on the second electronic device, user interfaces developed for the second electronic device can be readily used with the first electronic devices, thereby reducing software development time. In addition, users will see similar application views regardless of whether they are using the second electronic device (e.g., a mobile phone) or the first electronic device (e.g., a device with a larger touch-screen display), thereby eliminating the need for the user to learn a new user interface and improving the efficiency of the human-machine interface. Furthermore, because a portion of the first application view remains on the touch-sensitive display of the first electronic device, the user may use information displayed on the displayed portion of the first application view while interacting with the first popup view, thereby eliminating the need for the user to remember the information on the first application view and reducing the cognitive burden on the user.

The first electronic device detects (620) one or more second touch gestures within the first popup view (e.g., touch gesture 509, such as a tap gesture, within popup view 510 at a location that corresponds to the number "8" user interface object, FIG. 5J).

In response to detecting the one or more second touch gestures within the first popup view, the first electronic device performs (622) an action in the second application that updates a state of the second application (e.g., the number 8 is displayed within popup view 510, FIG. 5K). In some embodiments, performing the action in the second application includes updating the first popup view (e.g., calculator application view 510 for the calculator application is updated so that the number 8 is displayed, FIG. 5K).

In some embodiments, while displaying the first popup view, the application icons, and at least the portion of the first application view in the second mode (e.g., popup view 510, application icons 506-1 through 506-6, and a portion of web browser application view 502-7, FIG. 5K), the first electronic device detects (624), in the first predefined area, a third touch gesture of the first type (e.g., a tap gesture) on a second application icon that corresponds to a third application in the plurality of applications (e.g., map application icon 506-6, FIG. 5K). In response to detecting the third touch gesture of the first type on the second application icon, the first electronic device concurrently displays with the first popup view a second popup view partially covering at least the portion of the first application view (e.g., second popup view 514 partially covering web browser application view 502-7 is concurrently displayed with first popup view 510, FIG. 5L). The second popup view corresponds to a full-screen-width view of the third application on a respective electronic device (e.g., the second electronic device or a third electronic device distinct from the second electronic device, such as second electronic device 100-2 or third electronic device 100-3, FIG. 5L) having a touch-sensitive display with lower resolution than the touch-sensitive display of the first electronic device. Note that the full-screen-width view on the second electronic device may be either a portrait view or a landscape view of the application on the second electronic device.

In some embodiments, each popup view may be initially displayed in a respective preselected orientation (e.g., portrait or landscape) for a corresponding application. In addition, in some embodiments, the size of each popup view may be predetermined for each corresponding application. For example, in FIG. 5L, popup view 510 for the calculator application is at least initially displayed in a portrait orientation and a size that corresponds to a full-screen-width view of the corresponding calculator application on the second electronic device (e.g., a mobile phone device), and popup view 514 for the map application is at least initially displayed in a landscape orientation and a size that corresponds to a full-screen-width view of the corresponding map application on the third electronic device (e.g., a tablet device). Alternatively, in some embodiments, all popup views may be displayed in a same orientation (e.g., portrait or landscape) and/or a same size (e.g., a full-screen-width view on a same electronic device, such as the second electronic device or the third electronic device).

In response to detecting the one or more touch gestures within the second popup view, the first electronic device performs an action in the third application that updates a state of the third application. In some embodiments, performing the action in the third application includes updating the second popup view (e.g., moving, enlarging, or shrinking the displayed map in popup view 514 in response to touch gestures, not shown). Thus, a user can interact with multiple concurrently displayed popup views in one mode, yet also easily switch to interact with an application in a single application view mode.

In some embodiments, while in the second mode, the first electronic device detects (626, FIG. 6C), in the first predefined area, a fourth touch gesture of a second type (e.g., touch gesture 515, such as a tap-and-hold gesture, FIG. 5M) on a second application icon that corresponds to a third application in the plurality of applications (e.g., map application icon 506-6, FIG. 5M). In response to detecting the fourth touch gesture of the second type on the second application icon, the first electronic device ceases to display the first application view, ceases to display the application icons, exits the second mode, and displays on the touch-sensitive display an entire second application view that corresponds to the third application and occupies the entire touch-sensitive display without concurrently displaying an application view for any other application in the plurality of applications (e.g., entire map application view 502-1 in FIG. 5N).

In some embodiments, the first popup view is initially displayed adjacent to the first predefined area (e.g., popup view 510 is displayed adjacent to application icon area 504, FIG. 5O). While in the second mode, the first electronic device detects (628) a fifth touch gesture originating on the first popup view (e.g., touch gesture 517-A); and, while detecting the fifth touch gesture, moves the first popup view in accordance with the fifth touch gesture (e.g., FIGS. 5P-5Q).

In some embodiments, the first popup view includes one or more user interface objects (e.g., full-screen icon 520 and rotation icon 522, FIG. 5R). While in the second mode, the first electronic device detects (630) a sixth touch gesture (e.g., touch gesture 519, such as a tap gesture) on a first user interface object of the one or more user interface objects (e.g., full-screen icon 520). In response to detecting the sixth touch gesture on the first user interface object, the first electronic device ceases to display the first application view, ceases to display the application icons, ceases to display the first popup view, exits the second mode, and displays on the touch-sensitive display an entire third application view that corresponds to the second application and occupies the entire touch-sensitive display without concurrently displaying an application view for any other application in the plurality of applications (e.g., calculator application view 502-3, FIG. 5D).

In some embodiments, the first popup view corresponds to the full-screen-width view of the corresponding second application on the second electronic device in a first orientation (e.g., a portrait view or a landscape view). For example, in FIG. 5S, popup view 510 corresponds to a full-screen-width view of the corresponding calculator application on second electronic device 100-2 in a portrait orientation. The first popup view includes one or more user interface objects (e.g., full-screen icon 520 and rotation icon 522). While in the second mode, the first electronic device detects (632) a seventh touch gesture (e.g., touch gesture 521, such as a tap gesture) on a second user interface object of the one or more user interface objects (e.g., rotation icon 522). In response to detecting the seventh touch gesture on the second user interface object, the first electronic device displays a popup view that corresponds to a full-screen-width view of the corresponding second application on the second electronic device in a second orientation distinct from the first orientation (e.g., a landscape or portrait orientation). For example, in FIG. 5T, popup view 524 corresponds to a full-screen-width view of the corresponding calculator application on second electronic device 100-2 in a landscape orientation.

In some embodiments, while displaying the first popup view in the second mode, the first electronic device detects (634) a respective touch gesture at a location that corresponds to a respective portion of the first application view not covered by any popup view (e.g., touch gesture 523, such as a tap gesture, FIG. 5T). In response to detecting the respective touch gesture at a location that corresponds to the respective portion of the first application view not covered by any popup view, the first electronic device ceases to display the first popup view, ceases to display the application icons, exits the second mode, and displays the entire first application view (e.g., web browser application view 502-7, FIG. 5H). This provides an efficient method for the user to return from the second mode (e.g., the application selection and popup interaction mode) to the first mode (e.g., the single application view mode).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein.

Figure 7:
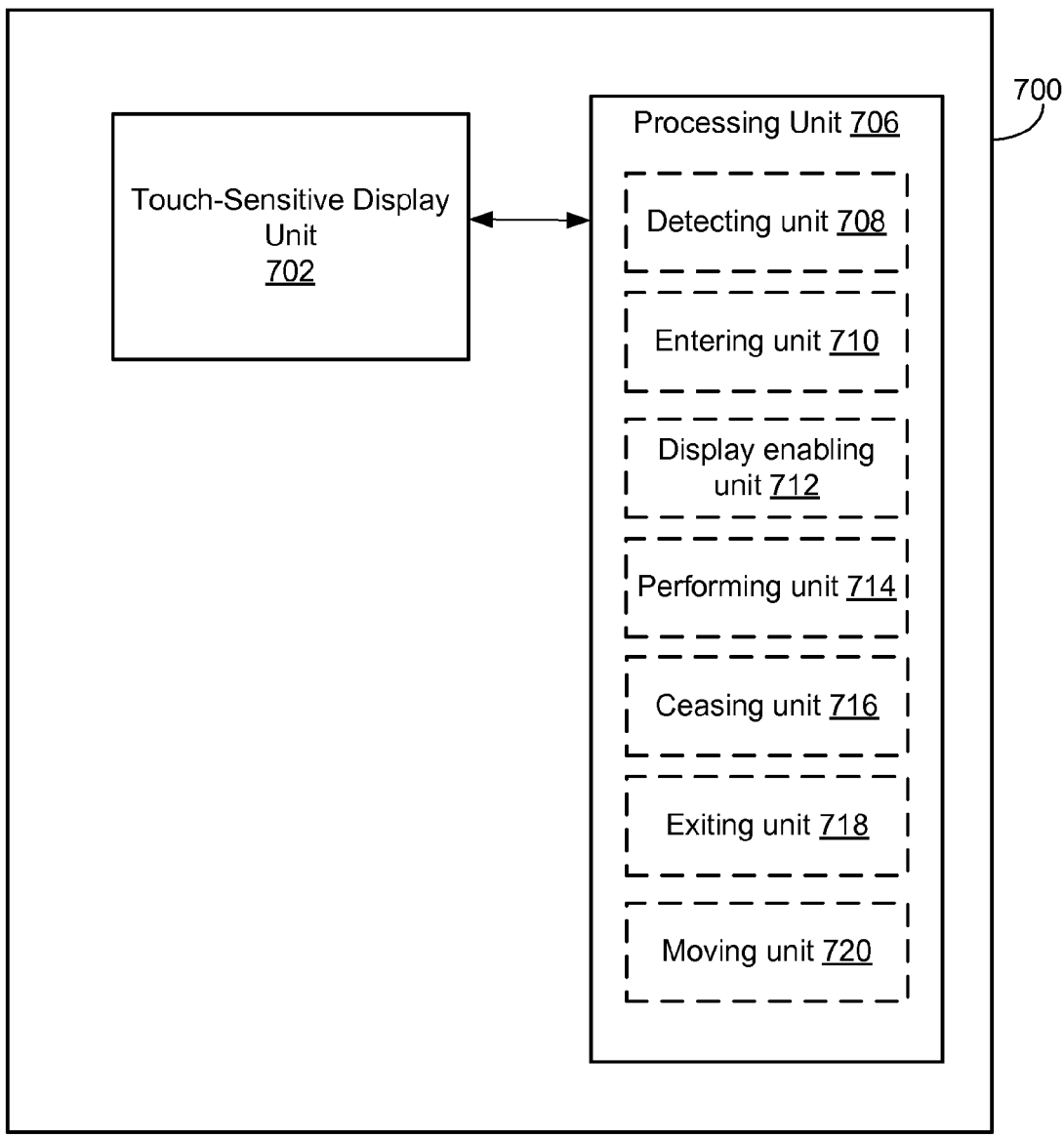
FIG. 7 is a functional block diagram of an electronic device in accordance with some embodiments.
Figure 7:
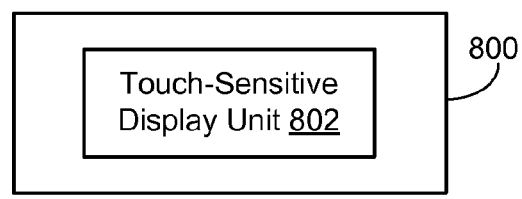

In accordance with some embodiments, FIG. 7 shows a functional block diagram of first electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein. For reference purposes, FIG. 7 also illustrates second electronic device 800, but second electronic device 800 is not part of first electronic device 700.

As shown in FIG. 7, first electronic device 700 includes touch-sensitive display unit 702 configured to display, while in a first mode, a first application view that corresponds to a first application in a plurality of applications. The first application view is displayed without concurrently displaying an application view for any other application in the plurality of applications. First electronic device 700 also includes processing unit 706 coupled to touch-sensitive display unit 702. In some embodiments, processing unit 706 includes detecting unit 708, entering unit 710, display enabling unit 712, performing unit 714, ceasing unit 716, exiting unit 718, and moving unit 720.

Processing unit 706 is configured to, while in the first mode: detect a first input (e.g., with detecting unit 708); and, in response to detecting the first input: enter a second mode distinct from the first mode (e.g., with entering unit 710), the second mode configured for interacting with popup views and selecting one of the applications for display of a corresponding application view; enable display, in a first predefined area, of an initial group of application icons that correspond to at least some of the plurality of applications (e.g., with display enabling unit 712 on touch-sensitive display unit 702); and enable concurrent display of at least a portion of the first application view adjacent to the first predefined area (e.g., with display enabling unit 712 on touch-sensitive display unit 702). Processing unit 706 is also configured to, while in the second mode: detect, in the first predefined area, a first touch gesture of a first type on a first application icon that corresponds to a second application in the plurality of applications (e.g., with detecting unit 708); and, in response to detecting the first touch gesture of the first type on the first application icon: enable display of a first popup view partially covering at least the portion of the first application view (e.g., with display enabling unit 712 on touch-sensitive display unit 702), wherein the first popup view corresponds to a full-screen-width view of a corresponding second application on second electronic device 800 having touch-sensitive display unit 802 with lower resolution than touch-sensitive display unit 702 of first electronic device 700; detect one or more second touch gestures within the first popup view (e.g., with detecting unit 708); and, in response to detecting the one or more second touch gestures within the first popup view, perform an action in the second application that updates a state of the second application (e.g., with performing unit 714).

In some embodiments, the plurality of applications is a plurality of concurrently open applications.

In some embodiments, the plurality of applications is a plurality of most recently used applications.

In some embodiments, processing unit 706 is configured to, while the first popup view, the application icons, and at least the portion of the first application view are displayed in the second mode (e.g., on touch-sensitive display unit 702): detect, in the first predefined area, a third touch gesture of the first type on a second application icon that corresponds to a third application in the plurality of applications (e.g., with detecting unit 708); and, in response to detecting the third touch gesture of the first type on the second application icon, enable concurrent display of the first popup view and a second popup view that partially covers at least the portion of the first application view (e.g., with display enabling unit 712), wherein the second popup view corresponds to a full-screen-width view of the third application on a respective electronic device (e.g., device 800) having a touch-sensitive display unit (e.g., touch-sensitive display unit 802) with lower resolution than touch-sensitive display unit 702 of first electronic device 700.

In some embodiments, processing unit 706 is configured to, while in the second mode: detect, in the first predefined area, a fourth touch gesture of a second type on a second application icon that corresponds to a third application in the plurality of applications (e.g., with detecting unit 708); and, in response to detecting the fourth touch gesture of the second type on the second application icon: cease to display the first application view (e.g., with ceasing unit 716); cease to display the application icons (e.g., with ceasing unit 716); exit the second mode (e.g., with existing unit 718); and enable display of an entire second application view that corresponds to the third application and occupies the entire touch-sensitive display on touch-sensitive display unit 702 without enabling concurrent display of an application view for any other application in the plurality of applications (e.g., with display enabling unit 712 on touch-sensitive display unit 702).

In some embodiments, the first popup view is initially displayed adjacent to the first predefined area; and processing unit 706 is configured to, while in the second mode: detect a fifth touch gesture originating on the first popup view (e.g., with detecting unit 708); and, while detecting the fifth touch gesture, move the first popup view in accordance with the fifth touch gesture (e.g., with moving unit 720).

In some embodiments, the first popup view includes one or more user interface objects; and processing unit 706 is configured to, while in the second mode: detect a sixth touch gesture on a first user interface object of the one or more user interface objects (e.g., with detecting unit 706); and, in response to detecting the sixth touch gesture on the first user interface object: cease to display the first application view (e.g., with ceasing unit 716); cease to display the application icons (e.g., with ceasing unit 716); cease to display the first popup view (e.g., with ceasing unit 716); exit the second mode (e.g., with exiting unit 718); and enable display of an entire third application view that corresponds to the second application and occupies the entire touch-sensitive display on touch-sensitive display unit 702 without enabling concurrent display of an application view for any other application in the plurality of applications (e.g., with display enabling unit 712 on touch-sensitive display unit 702).

In some embodiments, the first popup view corresponds to the full-screen-width view of the corresponding second application on second electronic device 800 in a first orientation; and the first popup view includes one or more user interface objects. Processing unit 706 is configured to, while in the second mode: detect an seventh touch gesture on a second user interface object of the one or more user interface objects (e.g., with detecting unit 708); and, in response to detecting the seventh touch gesture on the second user interface object, enable display of a popup view that corresponds to a full-screen-width view of the corresponding second application on second electronic device 800 in a second orientation distinct from the first orientation (e.g., with display enabling unit 712 on touch-sensitive display unit 702).

In some embodiments, processing unit 706 is configured to, while the first popup view is displayed in the second mode: detect a respective touch gesture at a location that corresponds to a respective portion of the first application view not covered by any popup view (e.g., with detecting unit 708); and, in response to detecting the respective touch gesture at a location that corresponds to the respective portion of the first application view not covered by any popup view: cease to display the first popup view (e.g., with detecting unit 708); cease to display the application icons (e.g., with detecting unit 708); exit the second mode (e.g., with exiting unit 718); and enable display of the entire first application view (e.g., with display enabling unit 712 on touch-sensitive display unit 702).

The operations in the information processing methods described above may be implemented by running one or more functional modules in information processing apparatus such as general purpose processors or application specific chips.

These modules, combinations of these modules, and/or their combination with general hardware (e.g., as described above with respect to FIGS. 1A and 3) are all included within the scope of protection of the invention.

The operations described above with reference to FIGS. 6A-6C may be implemented by components depicted in FIGS. 1A-1B. For example, detection operation 608, second mode entering operation 610, and displaying operation 612 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A first electronic device, comprising:
   a touch-sensitive display;
   one or more processors;
   memory; and
   one or more programs, wherein the one or more programs are stored in the memory and configured to be executed by the one or more processors, the one or more programs including instructions for:
      while in a first mode:
         displaying on the touch-sensitive display a first application view that corresponds to a first application in a plurality of applications, wherein the first application view is displayed without concurrently displaying an application view for any other application in the plurality of applications;
         detecting a first input; and,
         in response to detecting the first input:
            displaying in a first predefined area an initial group of application icons that correspond to at least some of the plurality of applications;
            concurrently displaying at least a portion of the first application view adjacent to the first predefined area; and
            entering a second mode distinct from the first mode, the second mode configured for interacting with popup views and selecting one of the applications for display of a corresponding application view; and,
      while in the second mode:
         detecting, in the first predefined area, a first touch gesture of a first type on a first application icon that corresponds to a second application in the plurality of applications;
         in response to detecting the first touch gesture of the first type on the first application icon, displaying a first popup view partially covering at least the portion of the first application view and maintaining display of the first predefined area, wherein the first popup view has a horizontal resolution that is the same as a horizontal resolution that a full-screen-width view of the second application is configured to have when displayed on a second electronic device having a touch-sensitive display with lower resolution than the touch-sensitive display of the first electronic device;
         detecting one or more second touch gestures within the first popup view; and,
         in response to detecting the one or more second touch gestures within the first popup view, performing an action in the second application that updates a state of the second application.

2. The first electronic device of claim 1, wherein the one or more programs include instructions for:
   while displaying the first popup view, the application icons, and at least the portion of the first application view in the second mode:
      detecting, in the first predefined area, a third touch gesture of the first type on a second application icon that corresponds to a third application in the plurality of applications; and,
      in response to detecting the third touch gesture of the first type on the second application icon, concurrently displaying with the first popup view a second popup view partially covering at least the portion of the first application view, wherein the second popup view corresponds to a full-screen-width view of the third application on a respective electronic device having a touch-sensitive display with lower resolution than the touch-sensitive display of the first electronic device.

3. The first electronic device of claim 1, wherein the one or more programs include instructions for:
   while in the second mode:
      detecting, in the first predefined area, a fourth touch gesture of a second type on a second application icon that corresponds to a third application in the plurality of applications; and,
      in response to detecting the fourth touch gesture of the second type on the second application icon:
         ceasing to display the first application view;
         ceasing to display the application icons;
         exiting the second mode; and
         displaying on the touch-sensitive display an entire second application view that corresponds to the third application and occupies the entire touch-sensitive display without concurrently displaying an application view for any other application in the plurality of applications.

4. The first electronic device of claim 1, wherein:
   the first popup view is initially displayed adjacent to the first predefined area; and
   the one or more programs include instructions for:
      while in the second mode:
         detecting a fifth touch gesture originating on the first popup view; and, while detecting the fifth touch gesture, moving the first popup view in accordance with the fifth touch gesture.

5. The first electronic device of claim 1, wherein:
the first popup view includes one or more user interface objects; and
the one or more programs include instructions for:
while in the second mode:
detecting a sixth touch gesture on a first user interface object of the one or more user interface objects; and,
in response to detecting the sixth touch gesture on the first user interface object:
ceasing to display the first application view;
ceasing to display the application icons;
ceasing to display the first popup view;
exiting the second mode; and
displaying on the touch-sensitive display an entire third application view that corresponds to the second application and occupies the entire touch-sensitive display without concurrently displaying an application view for any other application in the plurality of applications.

6. The first electronic device of claim 1, wherein:
the first popup view corresponds to the full-screen-width view of the second application on the second electronic device in a first orientation;
the first popup view includes one or more user interface objects; and
the one or more programs include instructions for:
while in the second mode:
detecting a seventh touch gesture on a second user interface object of the one or more user interface objects; and,
in response to detecting the seventh touch gesture on the second user interface object, displaying a popup view that corresponds to a full-screen-width view of the second application on the second electronic device in a second orientation distinct from the first orientation.

7. The first electronic device of claim 1, wherein the one or more programs include instructions for:
while displaying the first popup view in the second mode:
detecting a respective touch gesture at a location that corresponds to a respective portion of the first application view not covered by any popup view; and,
in response to detecting the respective touch gesture at a location that corresponds to the respective portion of the first application view not covered by any popup view:
ceasing to display the first popup view;
ceasing to display the application icons;
exiting the second mode; and
displaying the entire first application view.

8. A method, comprising:
at a first electronic device with a touch-sensitive display:
while in a first mode:
displaying on the touch-sensitive display a first application view that corresponds to a first application in a plurality of applications, wherein the first application view is displayed without concurrently displaying an application view for any other application in the plurality of applications;
detecting a first input; and,
in response to detecting the first input:
displaying in a first predefined area an initial group of application icons that correspond to at least some of the plurality of applications;
concurrently displaying at least a portion of the first application view adjacent to the first predefined area; and
entering a second mode distinct from the first mode, the second mode configured for interacting with popup views and selecting one of the applications for display of a corresponding application view; and,
while in the second mode:
detecting, in the first predefined area, a first touch gesture of a first type on a first application icon that corresponds to a second application in the plurality of applications;
in response to detecting the first touch gesture of the first type on the first application icon, displaying a first popup view partially covering at least the portion of the first application view and maintaining display of the first predefined area, wherein the first popup view has a horizontal resolution that is the same as a horizontal resolution that a full-screen-width view of the second application is configured to have when displayed on a second electronic device having a touch-sensitive display with lower resolution than the touch-sensitive display of the first electronic device;
detecting one or more second touch gestures within the first popup view; and,
in response to detecting the one or more second touch gestures within the first popup view, performing an action in the second application that updates a state of the second application.

9. A non-transitory computer readable storage medium storing one or more programs, the one or more programs comprising instructions, which when executed by a first electronic device with a touch-sensitive display, cause the device to:
while in a first mode:
display on the touch-sensitive display a first application view that corresponds to a first application in a plurality of applications, wherein the first application view is displayed without concurrently displaying an application view for any other application in the plurality of applications;
detect a first input; and,
in response to detecting the first input:
display in a first predefined area an initial group of application icons that correspond to at least some of the plurality of applications;
concurrently display at least a portion of the first application view adjacent to the first predefined area; and
entering a second mode distinct from the first mode, the second mode configured for interacting with popup views and selecting one of the applications for display of a corresponding application view; and,
while in the second mode:
detect, in the first predefined area, a first touch gesture of a first type on a first application icon that corresponds to a second application in the plurality of applications;
in response to detecting the first touch gesture of the first type on the first application icon, display a first popup view partially covering at least the portion of the first application view and maintaining display of the first predefined area, wherein the first popup view has a horizontal resolution that is the same as a horizontal resolution that a full-screen-width view of the second application is configured to have when displayed on a second electronic device having a touch-sensitive display with lower resolution than the touch-sensitive display of the first electronic device;

detect one or more second touch gestures within the first popup view; and, in response to detecting the one or more second touch gestures within the first popup view, perform an action in the second application that updates a state of the second application.

10. The method of claim 8, including:
while displaying the first popup view, the application icons, and at least the portion of the first application view in the second mode:
detecting, in the first predefined area, a third touch gesture of the first type on a second application icon that corresponds to a third application in the plurality of applications; and,
in response to detecting the third touch gesture of the first type on the second application icon, concurrently displaying with the first popup view a second popup view partially covering at least the portion of the first application view, wherein the second popup view corresponds to a full-screen-width view of the third application on a respective electronic device having a touch-sensitive display with lower resolution than the touch-sensitive display of the first electronic device.

11. The method of claim 8, including:
while in the second mode:
detecting, in the first predefined area, a fourth touch gesture of a second type on a second application icon that corresponds to a third application in the plurality of applications; and,
in response to detecting the fourth touch gesture of the second type on the second application icon:
ceasing to display the first application view;
ceasing to display the application icons;
exiting the second mode; and
displaying on the touch-sensitive display an entire second application view that corresponds to the third application and occupies the entire touch-sensitive display without concurrently displaying an application view for any other application in the plurality of applications.

12. The method of claim 8, wherein: the first popup view is initially displayed adjacent to the first predefined area; and the method includes:
while in the second mode:
detecting a fifth touch gesture originating on the first popup view; and,
while detecting the fifth touch gesture, moving the first popup view in accordance with the fifth touch gesture.

13. The method of claim 8, wherein:
the first popup view includes one or more user interface objects; and
the method includes:
while in the second mode:
detecting a sixth touch gesture on a first user interface object of the one or more user interface objects; and,
in response to detecting the sixth touch gesture on the first user interface object:
ceasing to display the first application view;
ceasing to display the application icons;
ceasing to display the first popup view;
exiting the second mode; and
displaying on the touch-sensitive display an entire third application view that corresponds to the second application and occupies the entire touch-sensitive display without concurrently displaying an application view for any other application in the plurality of applications.

14. The method of claim 8, wherein:
the first popup view corresponds to the full-screen-width view of the second application on the second electronic device in a first orientation;
the first popup view includes one or more user interface objects; and
the method includes:
while in the second mode:
detecting a seventh touch gesture on a second user interface object of the one or more user interface objects; and,
in response to detecting the seventh touch gesture on the second user interface object, displaying a popup view that corresponds to a full-screen-width view of the second application on the second electronic device in a second orientation distinct from the first orientation.

15. The method of claim 8, including:
while displaying the first popup view in the second mode:
detecting a respective touch gesture at a location that corresponds to a respective portion of the first application view not covered by any popup view; and,
in response to detecting the respective touch gesture at a location that corresponds to the respective portion of the first application view not covered by any popup view:
ceasing to display the first popup view;
ceasing to display the application icons;
exiting the second mode; and
displaying the entire first application view.

16. The non-transitory computer readable storage medium of claim 9, the one or more programs including instructions, which when executed by the first electronic device with the touch-sensitive display, cause the device to:
while displaying the first popup view, the application icons, and at least the portion of the first application view in the second mode:
detect, in the first predefined area, a third touch gesture of the first type on a second application icon that corresponds to a third application in the plurality of applications; and,
in response to detecting the third touch gesture of the first type on the second application icon, concurrently display with the first popup view a second popup view partially covering at least the portion of the first application view, wherein the second popup view corresponds to a full-screen-width view of the third application on a respective electronic device having a touch-sensitive display with lower resolution than the touch-sensitive display of the first electronic device.

17. The non-transitory computer readable storage medium of claim 9, the one or more programs including instructions, which when executed by the first electronic device with the touch-sensitive display, cause the device to:

while in the second mode:
  detect, in the first predefined area, a fourth touch gesture of a second type on a second application icon that corresponds to a third application in the plurality of applications; and,
  in response to detecting the fourth touch gesture of the second type on the second application icon:
    cease to display the first application view;
    cease to display the application icons;
    exit the second mode; and
    display on the touch-sensitive display an entire second application view that corresponds to the third application and occupies the entire touch-sensitive display without concurrently displaying an application view for any other application in the plurality of applications.

18. The non-transitory computer readable storage medium of claim 9, wherein:
  the first popup view is initially displayed adjacent to the first predefined area; and
  the one or more programs including instructions, which when executed by the first electronic device with the touch-sensitive display, cause the device to:
  while in the second mode:
    detect a fifth touch gesture originating on the first popup view; and, while detecting the fifth touch gesture, move the first popup view in accordance with the fifth touch gesture.

19. The non-transitory computer readable storage medium of claim 9, wherein:
  the first popup view includes one or more user interface objects; and
  the one or more programs including instructions, which when executed by the first electronic device with the touch-sensitive display, cause the device to:
  while in the second mode:
    detect a sixth touch gesture on a first user interface object of the one or more user interface objects; and,
    in response to detecting the sixth touch gesture on the first user interface object:
      cease to display the first application view;
      cease to display the application icons;
      cease to display the first popup view;
      exit the second mode; and
      display on the touch-sensitive display an entire third application view that corresponds to the second application and occupies the entire touch-sensitive display without concurrently displaying an application view for any other application in the plurality of applications.

20. The non-transitory computer readable storage medium of claim 9, wherein:
  the first popup view corresponds to the full-screen-width view of the second application on the second electronic device in a first orientation;
  the first popup view includes one or more user interface objects; and
  the one or more programs including instructions, which when executed by the first electronic device with the touch-sensitive display, cause the device to:
  while in the second mode:
    detect a seventh touch gesture on a second user interface object of the one or more user interface objects; and,
    in response to detecting the seventh touch gesture on the second user interface object, display a popup view that corresponds to a full-screen-width view of the second application on the second electronic device in a second orientation distinct from the first orientation.

21. The non-transitory computer readable storage medium of claim 9, the one or more programs including instructions, which when executed by the first electronic device with the touch-sensitive display, cause the device to:
  while displaying the first popup view in the second mode:
    detect a respective touch gesture at a location that corresponds to a respective portion of the first application view not covered by any popup view; and,
    in response to detecting the respective touch gesture at a location that corresponds to the respective portion of the first application view not covered by any popup view:
      cease to display the first popup view;
      cease to display the application icons;
      exit the second mode; and
      display the entire first application view.

* * * * *

UNITED STATES PATENT AND TRADEMARK OFFICE
CERTIFICATE OF CORRECTION

| | | |
|---|---|---|
| PATENT NO. | : 8,806,369 B2 | Page 1 of 1 |
| APPLICATION NO. | : 13/333909 | |
| DATED | : August 12, 2014 | |
| INVENTOR(S) | : May-Li Khoe et al. | |

It is certified that error appears in the above-identified patent and that said Letters Patent is hereby corrected as shown below:

On the Title Page

On page 2, in column 2, under "Other Publications", line 17, delete "ApplehInsider.com," and insert -- AppleInsider.com, --, therefor.

Signed and Sealed this
Twenty-third Day of December, 2014

Michelle K. Lee
*Deputy Director of the United States Patent and Trademark Office*